(12) United States Patent
Suzumura et al.

(10) Patent No.: US 12,339,619 B2
(45) Date of Patent: Jun. 24, 2025

(54) TONER

(71) Applicant: CANON KABUSHIKI KAISHA, Tokyo (JP)

(72) Inventors: Yoshitaka Suzumura, Shizuoka (JP); Dai Nozaki, Shizuoka (JP); Tomohiro Unno, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 775 days.

(21) Appl. No.: 17/526,486

(22) Filed: Nov. 15, 2021

(65) Prior Publication Data

US 2022/0171301 A1 Jun. 2, 2022

(30) Foreign Application Priority Data

Nov. 30, 2020 (JP) .................. 2020-199152

(51) Int. Cl.
*C08G 63/672* (2006.01)
*G03G 9/083* (2006.01)
(Continued)

(52) U.S. Cl.
CPC ........... *G03G 9/083* (2013.01); *C08G 63/672* (2013.01); *G03G 9/08728* (2013.01); *G03G 9/093* (2013.01); *G03G 9/097* (2013.01)

(58) Field of Classification Search
None
See application file for complete search history.

(56) References Cited

U.S. PATENT DOCUMENTS 7,811,734 B2   10/2010   Ogawa et al.
8,227,162 B2    7/2012   Sano et al.
(Continued)

FOREIGN PATENT DOCUMENTS

JP        01156759 A  *  6/1989  ........... G03G 9/0906
JP     2006293285 A  * 10/2006  ........... G03G 9/0819
(Continued)

OTHER PUBLICATIONS

JP-2006293285-A Translation (Year: 2024).*
(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

The toner contains a toner particle having a core-shell structure including: a core containing a binder resin and a colorant; and a shell, wherein the toner contains a crystalline material, and the shell contains an amorphous thermoplastic resin; and when SP values of the crystalline material and the amorphous thermoplastic resin, which are calculated by the Fedors method, are defined as SPc $(J/cm^3)^{0.5}$ and SPa $(J/cm^3)^{0.5}$, respectively, the SPc and the SPa $(J/cm^3)$ satisfy a particular relationship, and when the toner is observed by SEM after the toner has been subjected to ruthenium staining that treats the toner in an atmosphere of $RuO_4$ gas having 500 Pa for 15 minutes, a ratio S2 (%) of an area occupied by the crystalline material per area of the toner satisfies a particular relationship.

9 Claims, 3 Drawing Sheets

(51) Int. Cl.
*G03G 9/087* (2006.01)
*G03G 9/093* (2006.01)
*G03G 9/097* (2006.01)

(56) References Cited

U.S. PATENT DOCUMENTS

| | | | |
|---|---|---|---|
| 8,426,094 B2 | 4/2013 | Magome et al. | |
| 8,614,044 B2 | 12/2013 | Matsui et al. | |
| 8,778,585 B2 | 7/2014 | Matsui et al. | |
| 8,918,035 B2 | 12/2014 | Hasegawa et al. | |
| 9,029,055 B2 | 5/2015 | Aoki et al. | |
| 9,213,250 B2 | 12/2015 | Nomura et al. | |
| 9,239,528 B2 | 1/2016 | Hasegawa et al. | |
| 9,244,371 B2 | 1/2016 | Suzumura et al. | |
| 9,417,542 B2 | 8/2016 | Hiroko et al. | |
| 9,625,841 B2 | 4/2017 | Hiroko et al. | |
| 9,658,549 B2 | 5/2017 | Tanaka et al. | |
| 9,804,514 B2 | 10/2017 | Suzumura et al. | |
| 9,804,519 B2 | 10/2017 | Suzumura et al. | |
| 9,841,692 B2 | 12/2017 | Hasegawa et al. | |
| 9,880,478 B2 | 1/2018 | Shimano et al. | |
| 9,927,728 B2 | 3/2018 | Arimura et al. | |
| 9,946,179 B2 | 4/2018 | Arimura et al. | |
| 9,946,181 B2 | 4/2018 | Hasegawa et al. | |
| 9,964,874 B2 | 5/2018 | Suzumura et al. | |
| 9,964,881 B2 | 5/2018 | Ikejiri et al. | |
| 9,971,262 B2 | 5/2018 | Hasegawa et al. | |
| 9,971,264 B2 | 5/2018 | Sano et al. | |
| 10,012,923 B2 | 7/2018 | Sano et al. | |
| 10,228,627 B2 | 3/2019 | Nagashima et al. | |
| 10,310,397 B2 | 6/2019 | Sano et al. | |
| 10,545,420 B2 | 1/2020 | Kinumatsu et al. | |
| 10,698,327 B2 | 6/2020 | Nagashima et al. | |
| 10,747,136 B2 | 8/2020 | Kenmoku et al. | |
| 11,181,839 B2 | 11/2021 | Yamashita et al. | |
| 11,181,840 B2 | 11/2021 | Nagata et al. | |
| 11,181,846 B2 | 11/2021 | Kinumatsu et al. | |
| 2008/0025754 A1* | 1/2008 | Ishiyama | G03G 9/08795 399/106 |
| 2009/0197192 A1 | 8/2009 | Hiroko et al. | |
| 2016/0378003 A1 | 12/2016 | Arimura et al. | |
| 2020/0409282 A1 | 12/2020 | Unno et al. | |
| 2021/0080846 A1 | 3/2021 | Mizuguchi et al. | |
| 2021/0356878 A1 | 11/2021 | Mizuguchi et al. | |

FOREIGN PATENT DOCUMENTS

| | | | |
|---|---|---|---|
| JP | 2009-63969 A | | 3/2009 |
| JP | 2011020910 A | * | 2/2011 |
| JP | 2015-59949 A | | 3/2015 |
| JP | 2015-121577 A | | 7/2015 |
| JP | 2017-40845 A | | 2/2017 |
| JP | 2017040845 A | * | 2/2017 |
| JP | 2017-44952 A | | 3/2017 |
| JP | 2018-159781 A | | 10/2018 |
| JP | 2019-86764 A | | 6/2019 |
| JP | 6584218 B2 | | 10/2019 |
| JP | 2020-34714 A | | 3/2020 |
| JP | 2020-187224 A | | 11/2020 |

OTHER PUBLICATIONS

JP-01156759-A Translation (Year: 2024).*
JP-2017040845-A (Year: 2024).*
JP-2011020910-A Translation (Year: 2025).*
U.S. Appl. No. 17/519,938, Yuta Komiya, filed Nov. 5, 2021.
U.S. Appl. No. 17/520,044, Dai Nozaki, filed Nov. 5, 2021.
Fedors, A Method for Estimating Both the Solubility Paranmeters and Molar Volumes of Liquids, Poly. Eng. Sci., vol. 14, No. 2 (1974) 147.
Membrane Science and Technology, Second Edition, Higher Ed. Press (2004) 143-49.
Concise Handbook of Plastics, Dalian Univ. Press (1988) 205-6.

* cited by examiner

TONER

BACKGROUND OF THE INVENTION

Field of the Invention

The present disclosure relates to a toner to be used in an image forming method, such as an electrophotography.

Description of the Related Art

In recent years, image forming apparatuses such as copying machines and printers are required to have a higher speed, a higher image quality and higher stability, as the purpose of use and the environment of use is more diversified.

In the electrophotography, the process passes: a charging process of charging an electrostatic latent image bearing member (hereinafter referred to as "photoreceptor") by a charging unit; an exposure process of exposing the charged electrostatic latent image bearing member to light and forming an electrostatic latent image; and a developing process of developing the electrostatic latent image with a toner and forming a toner image. Subsequently, the process passes: a transfer process of transferring the toner image onto a recording material through or not through an intermediate transfer member; and a fixing process of heating, pressurizing and fixing the toner image by passing the recording material that carries the toner image through a nip portion which is formed by a pressurizing member and a rotatable image heating member; and thereby, the toner image is output as an image.

In order to cope with the tendency of enhancing an image quality and further saving energy in recent years, it becomes important to optimize each process, but for the image quality in particular, among the tendencies, a developing process becomes important which develops an electrostatic latent image with a toner to form an enhancing toner image, and for saving energy, it has been conventionally important to fix the toner image sufficiently at a low temperature.

As a unit for improving the fixability, studies have been carried out on such a crystalline material as to rapidly dissolve in a binder resin of the toner and promote melt deformation of a toner particle.

In Japanese Patent No. 6584218, a toner is disclosed that is excellent in low-temperature fixability and storage stability.

In Japanese Patent Application Laid-Open No. 2020-34714, a toner is disclosed that is excellent in low-temperature fixability and durability.

SUMMARY OF THE INVENTION

According to studies by the present inventors, it has been confirmed that the toner according to Japanese Patent No. 6584218 is excellent in the low-temperature fixability and the storage stability. However, it has been recognized that there is still room for improvement, in consideration of the speeding up of the image forming process in recent years. Specifically, such a phenomenon has been observed that unevenness occurs in the releasability of the toner image that has passed the fixing process. As a result, there has been a case where contamination of the member is aggravated that conveys a medium.

According to the studies by the present inventors, it has been confirmed that the toner according to Japanese Patent Application Laid-Open No. 2020-34714 is excellent in the low-temperature fixability and the durability. However, it has been recognized that there is still room for improvement, in consideration of the speeding up of the image forming process in recent years. Specifically, such a phenomenon has been observed that unevenness occurs in the releasability of the toner image that has passed the fixing process. As a result, there has been a case where contamination of a member is aggravated that conveys the medium.

One aspect of the present disclosure is directed to providing a toner excellent in the low-temperature fixability and in the formation of high-quality electrophotographic images, even when having been applied to a high-speed electrophotographic image forming process.

The present disclosure relates to a toner containing a toner particle having a core-shell structure including: a core containing a binder resin and a colorant; and a shell, wherein the toner contains a crystalline material, and the shell contains an amorphous thermoplastic resin; and when an SP value of the crystalline material calculated by the Fedors method is defined as SPc $(J/cm^3)^{0.5}$, and an SP value of the amorphous thermoplastic resin calculated by the Fedors method is defined as SPa $(J/cm^3)^{0.5}$, the SPc and the SPa satisfy the following expression (1), and when the toner surface is observed by a scanning electron microscope (SEM) after the toner has been subjected to ruthenium staining that treats the toner in an atmosphere of $RuO_4$ (ruthenium tetroxide) gas having 500 Pa for 15 minutes, and a ratio of an area occupied by the crystalline material per area of the toner surface is defined as S2(%), the S2(%) satisfies the following expression (2).

$$2.50 \leq SPa - SPc \leq 4.50 \tag{1}$$

$$1.0 \leq S2 \leq 20.0 \tag{2}$$

According to one aspect of the present disclosure, the toner can be obtained that is excellent in the low-temperature fixability, the durability, and the prevention of contamination of a conveying member, even when having been applied to a high-speed electrophotographic image forming process.

Further features of the present disclosure will become apparent from the following description of exemplary embodiments with reference to the attached drawings.

DESCRIPTION OF THE EMBODIMENTS

Figure 1:
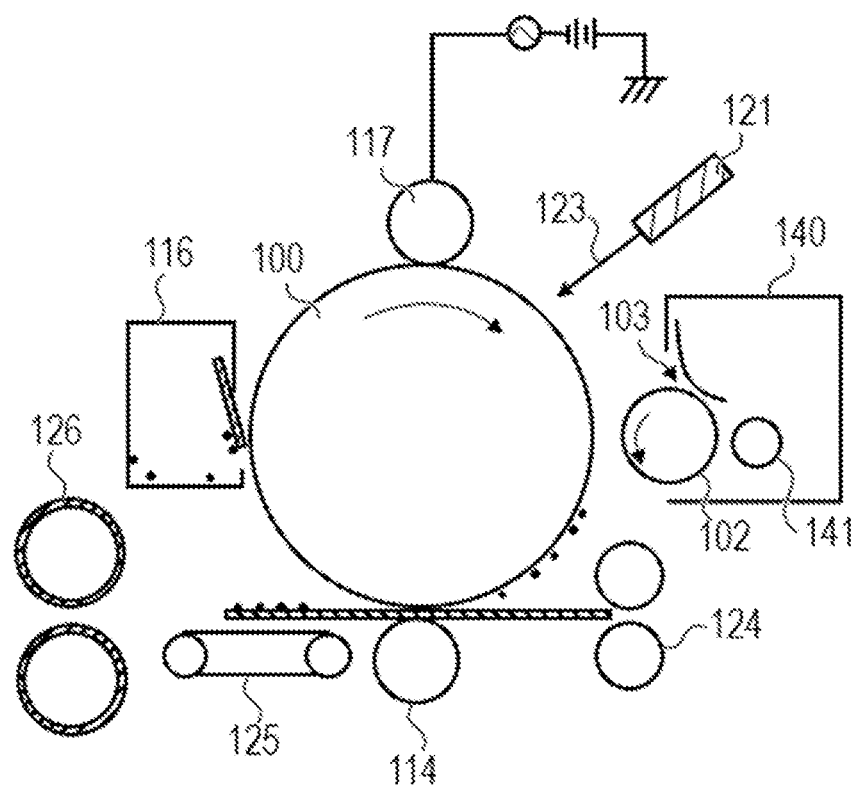
FIG. 1 illustrates a view illustrating one example of an electrophotographic image forming apparatus.

Preferred embodiments of the present disclosure will now be described in detail in accordance with the accompanying drawings.

In order that a toner achieves the low-temperature fixability while balancing with the storage stability and the durability, a toner having a core-shell structure is suitable. Specifically, the toner having a shell is suitable for preventing a core from heat or mechanical impact by the shell, even in the case where the toner has the core that is excellent in the low-temperature fixability and is softened at a low temperature. However, in a fixing process, the shell hinders the outflow of a plasticizer and a release agent contained in the core to the toner surface, and accordingly, the surface of a toner image that has passed the fixing process tends to be poor in releasability. For this reason, the toner image poor in releasability tends to easily adhere to a member that conveys a medium that has passed the fixing process, and contamination occurs in the member. As a result, the toner image having adhered to the contaminated member results in migrating to the medium, and a longitudinal streak occurs. In particular, in a high-speed electrophotographic image forming process, a time period given for the fixing process is very short. This makes it difficult for the crystalline material to migrate to the surface of the toner image, and accordingly makes it difficult for the toner image to enhance the releasability. Because of this, in a toner having a core-shell structure, there is a problem of contamination of the member that conveys the medium.

Therefore, the present inventors have made studies in order to promote the exudation of the crystalline material to the surface of the toner image, in the fixing process. As a result, it has been found that it can satisfactorily respond to the above requirements to allow a crystalline material and a shell which have a large difference in solubility parameter to coexist on the surface of the toner.

Specifically, the present disclosure is as follows.

The toner containing a toner particle having a core-shell structure including: a core containing a binder resin and a colorant; and a shell, wherein
  the toner contains a crystalline material, and the shell contains an amorphous thermoplastic resin;
  when an SP value of the crystalline material calculated by the Fedors method is defined as SPc $(J/cm^3)^{0.5}$, and an SP value of the amorphous thermoplastic resin calculated by the Fedors method is defined as SPa $(J/cm^3)^{0.5}$, the SPc and the SPa satisfy the following expression (1), and
  when the toner is observed by a scanning electron microscope (SEM) after the toner has been subjected to ruthenium staining that treats the toner in an atmosphere of $RuO_4$ (ruthenium tetroxide) gas having 500 Pa for 15 minutes, and a ratio of an area occupied by the crystalline material per area of the toner is defined as S2(%), the S2(%) satisfies the following expression (2).

$$2.50 \le SPa - SPc \le 4.50 \quad (1)$$

$$1.0 \le S2 \le 20.0 \quad (2)$$

As a result of studies by the present inventors, by use of the above toner, a toner can be provided that is excellent in the low-temperature fixability, the durability and the storage stability, and besides can reduce the contamination of a conveying member.

The above expression (1) means that the difference is relatively large between the SPc of the crystalline material calculated by the Fedors method and the SPa of the amorphous thermoplastic resin calculated by the Fedors method.

In addition, the above expression (2) means that the amount of the crystalline material existing near the surface of the toner is relatively large.

As a result of studies by the present inventors, it has been found that in the toner having the above-described structure, when the toner is melted and deformed in the fixing process, the crystalline material having a large difference in the SP value from the amorphous thermoplastic resin vigorously flows out to the surface of the toner. Thereby, the amount of the crystalline material existing can be increased that exists on the surface of the toner image which has passed the fixing process. The present inventors have found that because of this, the toner image has sufficient releasability, and accordingly the toner can reduce the contamination of the conveying member.

In addition, also in an evaluation environment in which the storage stability of the toner is assumed to be conventionally tested, the toner can prevent the change of its performance, because the difference in the SP values between the amorphous thermoplastic resin and the crystalline material is sufficiently large.

Furthermore, also in a durability test to be conventionally assumed, a high-quality image can be obtained through the durability test, because the difference in the SP values between the amorphous thermoplastic resin and the crystalline material is sufficiently large.

When the toner surface is observed by SEM after the toner has been subjected to ruthenium staining that treats the toner in an atmosphere of ruthenium tetroxide gas having 500 Pa for 15 minutes, a ratio S2(%) of an area occupied by the crystalline material per area of the toner surface is 1.0% or larger and 20.0% or smaller. When the toner is dyed in the atmosphere of ruthenium tetroxide gas having 500 Pa for a long time, a region from the surface of the toner to a depth of approximately 100 nm is dyed with the ruthenium tetroxide gas. At this time, the ease of dying by ruthenium tetroxide is different between the crystalline material and the amorphous material. When the toner that has been previously subjected to such treatment is observed with SEM or TEM, an existing state of the crystalline material can be visualized.

In addition, by the comparison of an interval between lamellae of a single crystalline material that has been treated in the same manner, which is derived from the crystallinity and is observed by SEM or TEM, with an interval between lamellae of the crystalline material to be detected as S2, the crystalline material to be detected as S2 can be identified. As a method for obtaining the single crystalline material, a crystalline material to be used for producing the toner may be used, or a crystalline material that is obtained by isolation from the toner may be used.

Examples of a method for controlling the ratio S2 of the area occupied by the crystalline material include: a method of arranging a hydrophobized magnetic material having affinity with the crystalline material, in the vicinity of the surface, which will be described below; and an emulsion aggregation method in which an emulsified crystalline material is aggregated in multiple stages.

Figure 2:
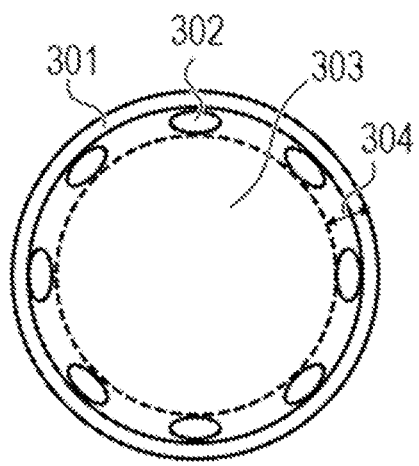
FIG. 2 illustrates a view illustrating one example of a core-shell structure of the present disclosure.
Figure 3:
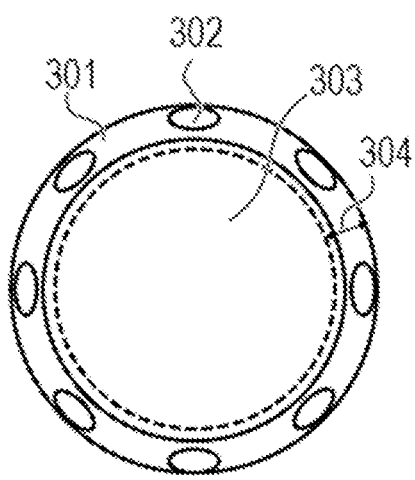
FIG. 3 illustrates a view illustrating one example of the core-shell structure of the present disclosure.
Figure 4:
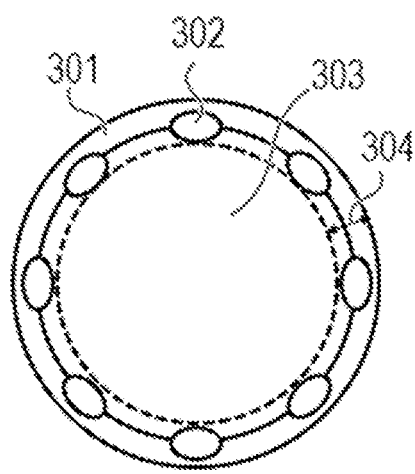
FIG. 4 illustrates a view illustrating one example of the core-shell structure of the present disclosure.

Examples of schematic views of the toner that is shown in the present disclosure are illustrated in FIGS. 2 to 4.

FIG. 2 illustrates a state in which the shell is thin and a crystalline material exists in the core.

FIG. 3 illustrates a state in which the shell is thick and a crystalline material exists in the shell.

FIG. 4 illustrates a state in which the thickness of the shell is intermediate and a crystalline material exists in the core and the shell.

When the toner has any of the configurations illustrated in FIGS. 2 to 4, the effects of the present disclosure can be obtained.

The effect of the present disclosure will be described with reference to the schematic view of the toner illustrated in FIG. 2. Reference numeral 301 denotes the shell, reference numeral 302 denotes the crystalline material, reference numeral 303 denotes the core, and reference numeral 304 denotes the region that is dyed with ruthenium tetroxide. According to the study of the inventors, the region 304 that is dyed by ruthenium tetroxide is approximately 100 nm from the surface of the toner. When the toner is fixed, the shell 301 and the core 303 are deformed by heat of a fixing device. At this time, the crystalline material 302 vigorously flows out toward the surface of the toner. Thereby, the amount of the crystalline material existing on the surface of the toner image can be increased, and accordingly, the contamination of the conveying member can be greatly reduced, which is an effect of the present disclosure. In order to obtain the effect of the present disclosure, it is important that the shell and the crystalline material simultaneously exist in the region 304.

In the present disclosure, when an SP value of the crystalline material calculated by the Fedors method is defined as SPc $(J/cm^3)^{0.5}$, and an SP value of the amorphous thermoplastic resin calculated by the Fedors method is defined as SPa $(J/cm^3)^{0.5}$, it is preferable that the SPc and the SPa satisfy the following expression (1).

$$2.50 \leq SPa-SPc \leq 4.50 \tag{1}$$

When SPa−SPc is smaller than 2.50, the releasability of the toner image may be insufficient, and accordingly the contamination of the conveying member is not improved in some cases. Meanwhile, when the SPa−SPc exceeds 4.50, it is difficult for the amorphous thermoplastic resin to form a shell, and accordingly the durability and the storage stability may be inferior.

In the present disclosure, when the toner surface is observed by a scanning electron microscope (SEM) after the toner has been subjected to ruthenium staining that treats the toner in an atmosphere of $RuO_4$ (ruthenium tetroxide) gas having 500 Pa for 15 minutes, and a ratio of an area occupied by the crystalline material per area of the toner surface is defined as S2(%), it is preferable that the S2(%) satisfies the following expression (2).

$$1.0 \leq S2 \leq 20.0 \tag{2}$$

When the S2 is smaller than 1.0, the releasability of the toner image may be insufficient, and accordingly the contamination of the conveying member is not improved in some cases. Meanwhile when the S2 exceeds 20.0, it is difficult for the amorphous thermoplastic resin to form a shell, and accordingly the durability and the storage stability may be inferior.

In the present disclosure, it is preferable that the toner has a viscosity at 100° C. measured by a flow tester temperature raising method is $0.5 \times 10^4$ to $9.0 \times 10^5$ Pa·s. When the viscosity at 100° C. satisfies the above-described range, a toner can be provided that is excellent in the low-temperature fixability. Furthermore, in the fixing process, it becomes easy for the toner to be melted and deformed, and accordingly, it becomes easy for the crystalline material to seep out to the surface of the toner image. Because of this, the contamination of the conveying member tends to be easily improved.

In the present disclosure, it is preferable that the SPa is 11.60 to 12.40 $(J/cm^3)^{0.5}$. When the SPa satisfies the above-described range, it becomes easy to control the above expression (1) and expression (2) in the present disclosure in a suitable range, even when any crystalline material is employed, and it becomes easy for the toner to exhibit the effect of the present disclosure.

In the present disclosure, the amorphous thermoplastic resin is preferably an amorphous polyester. The amorphous polyester is excellent in chargeability and thermoplasticity, and accordingly, the toner becomes excellent in the low-temperature fixability and the durability. Furthermore, by selection of the monomer unit of the amorphous polyester resin, it becomes easy to control SPa and the expression (1) within a range suitable for the present disclosure.

In the present disclosure, the amorphous polyester preferably has an isosorbide unit represented by the formula (3).

(3)

The isosorbide unit has a high phase separation property from the crystalline material. Because of this, excellent storage stability and durability can be easily provided. Furthermore, it becomes easy for the isosorbide unit to promote the exudation of the crystalline material to the toner surface in the fixing process, and accordingly it becomes easy to reduce the contamination of the conveying member.

In the present disclosure, the amorphous polyester is a condensate of only at least one alcohol component selected from the group consisting of dihydric and trihydric or higher alcohols, and at least one carboxylic acid component selected from the group consisting of aromatic polycarboxylic acids, aliphatic polycarboxylic acids, and anhydrides thereof, wherein the alcohol component includes at least isosorbide; the alcohol component and the carboxylic acid component do not have an ester group; and the amorphous polyester preferably contains the isosorbide unit represented by the formula (3) derived from the isosorbide in an amount of 0.10 to 30.00 mol % based on all of the monomer unit derived from the alcohol component and the monomer unit derived from the carboxylic acid component. When the content of the isosorbide unit satisfies the above-described range, it becomes easy to provide the excellent storage stability and durability. Furthermore, it becomes easy for the isosorbide unit to promote the exudation of the crystalline material to the toner surface in the fixing process, and accordingly it becomes easy to reduce the contamination of the conveying member.

In the present disclosure, it is preferable that the colorant is a colorant the surface of which is subjected to hydrophobizing treatment with a silane coupling agent. Due to the hydrophobizing treatment with the silane coupling agent, it becomes easy to control the above-described S2 within a range suitable for the present disclosure, in a suspension polymerization method which is a preferable production method for the present disclosure.

In the present disclosure, it is preferable that the hydrophobized colorant is a hydrophobized magnetic material. Due to the colorant being the hydrophobized magnetic material, it becomes easy for the hydrophobized magnetic material to exist in the vicinity of the surface of the toner, in the suspension polymerization method which is a preferable production method for the present disclosure. Because of this, it becomes easy to control the amount of the crystalline material existing near the surface of the toner, in the suspension polymerization method.

In the present disclosure, it is preferable that the hydrophobized magnetic material has, in a spectrum of Si obtained based on a total electron yield method (TEY) using a near-edge X-ray absorption fine structure (NEXAFS), a peak A in a range of 1844.4 to 1844.8 eV and a peak B in a range of 1846.1 to 1846.6 eV, and that $I_A/(I_A+I_B)/M_{Si}$ is 40 to 55, wherein $I_A$ represents an area of the peak A, $I_B$ represents an area of the peak B, and $M_{Si}$ represents the number of moles of Si derived from the silane compound contained in 1 g of the hydrophobized magnetic material.

According to NEXAFS, information can be obtained that concerns a state of a silane compound which is bonded to an Fe atom in the magnetic material. It can be determined that as the peak A in the absorption spectrum of Si is larger, the amount of the silane compound bonded to the surface of the magnetic material is smaller, and on the contrary, that as the peak B is larger, the amount of the silane compound bonded to the surface of the magnetic material is larger.

When the absorption spectrum of Si is measured using the above-described NEXAFS, a bonded state between the magnetic material and the silane coupling agent can be evaluated with satisfactory reproducibility. It has been found that it is important for the silane compound to satisfy the following expression (5) in order to exhibit a desired function.

$$I_A/(I_A+I_B)/M_{Si}=40 \text{ to } 55 \tag{5}$$

wherein $I_A$ represents an area of the peak A, $I_B$ represents an area of the peak B, and $M_{Si}$ represents the number of moles of Si derived from the silane compound contained per 1 g of the hydrophobized magnetic material. The reason for dividing the value of $I_A/(I_A+I_B)$ by the value of $M_{Si}$ is for normalization.

The fact that the value of the expression (5) is high means that among the hydrophobizing treatment agents, the amount of the treatment agents which have been condensed with each other is relatively larger than the amount of the treatment agent which has been bonded to the magnetic material. A chemical compound obtained by polycondensation of the hydrophobizing treatment agents acquires extremely high hydrophobicity, and tends to easily enhance the affinity with the crystalline material. Because of this, it becomes easy for a large amount of crystalline material to exist in the vicinity of the magnetic material. Thereby, it becomes easy for the hydrophobized magnetic material to exist in the vicinity of the surface of the toner, in the suspension polymerization method which is a preferable production method for the present disclosure. Because of this, it becomes easy to control the amount of the crystalline material existing near the surface of the toner, in the suspension polymerization method.

The toner of the present disclosure includes a toner particle having a core-shell structure that includes: a core containing a binder resin and a colorant; and a shell.

The core-shell structure is a structure in which the core is covered with the shell. The toner of the present disclosure includes a crystalline material, and the effect of the present disclosure can be obtained regardless of whether the crystalline material is contained in the core or the shell. In addition, the effect of the present disclosure can be obtained even when the crystalline material is contained in both the core and the shell.

(Shell)

In the present disclosure, the shell contains the amorphous thermoplastic resin.

The thermoplastic resin refers to a resin that melts and deforms when having been heated.

In the present disclosure, it is preferable that the thermoplastic resin is an amorphous polyester.

As the amorphous polyester in the present disclosure, a saturated polyester resin, an unsaturated polyester resin, or both of the resins can be appropriately selected and used.

As the amorphous polyester that is used in the present disclosure, a known amorphous polyester can be used which is produced from an alcohol component and an acid component. Examples of both of the components will be shown below.

Examples of the alcohol component include: ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexenedimethanol, and hydrogenated bisphenol A; bisphenol represented by the following formula (A) and derivatives thereof; and diols represented by the following formula (B).

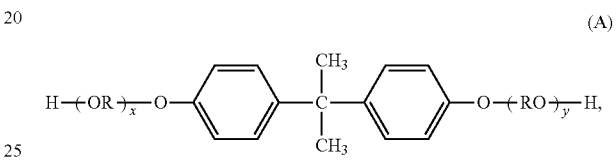

(A)

wherein R is an ethylene or propylene group; X and y are each an integer of 0 or larger, where an average value of x+y is 0 to 10; and for information, the propylene group is a functional group derived from 2-propanediol.

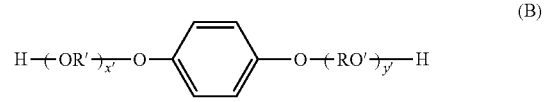

(B)

(B1)

(B2)

(B3)

wherein R' is any one of the above (B1) to (B3); and x' and y' are each an integer of 0 or larger, where an average value of x'+y' is 0 to 10.

In the present disclosure, the amorphous polyester is preferably a bisphenol represented by the formula (A) and a derivative thereof, from the viewpoint of reactivity, and is more preferably a chemical compound of a bisphenol represented by the formula (A) and derivatives thereof wherein the average value of x+y is 1 to 4.

Examples of trihydric or higher alcohols that can be used in the preparation of the amorphous polyester include: sorbitol, 1,2,3,6-hexanetetrol, 1,4-sorbitan, pentaerythritol, dipentaerythritol, tripentaerythritol, 1,2,4-butanetriol, trimethylolethane, trimethylolpropane, and 1,3,5-trihydroxymethylbenzene.

Examples of divalent carboxylic acids that can be used in the preparation of the amorphous polyester include dicarboxylic acids and derivatives thereof that include: benzenedicarboxylic acids such as phthalic acid, terephthalic acid, isophthalic acid, phthalic anhydride, and anhydrides and lower alkyl esters thereof; alkyl dicarboxylic acids such as succinic acid, adipic acid, sebacic acid, azelaic acid, and anhydrides and lower alkyl esters thereof, alkenyl succinic acids or alkyl succinic acids such as n-dodecenylsuccinic acid or n-dodecylsuccinic acid, and anhydrides and lower alkyl esters thereof, and unsaturated dicarboxylic acids such as fumaric acid, maleic acid, citraconic acid, itaconic acid, and anhydrides and lower alkyl esters thereof. In the present disclosure, benzenedicarboxylic acids such as terephthalic acid and isophthalic acid are preferably used from the viewpoint of handleability and reactivity.

Examples of carboxylic acid components having polyvalency of trivalency or higher, which can be used in the preparation of the amorphous polyester, include: polyvalent carboxylic acids and derivatives thereof such as trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxy propane, tetra(methylenecarboxyl)methane, 1,2,7,8-octanetetracarboxylic acid, empol trimer acids, and anhydrides and lower alkyl esters thereof; and tetracarboxylic acids represented by the following formula (C)

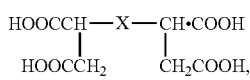

(C)

wherein X represents an alkylene group or an alkenylene group, where X is a substituent having 5 to 30 carbon atoms and having one or more side chains having 3 or more carbon atoms, and anhydrides and lower alkyl esters thereof. In the present disclosure, trimellitic acid is preferably used in view of reactivity and ease of adjustment of an acid value of the resin.

Examples of the alcohol component include polyhydric alcohols such as glycerin, pentaerythritol, sorbit, sorbitan, and oxyalkylene ethers of novolak type phenol resins; and examples of the acid component include polyvalent carboxylic acids such as trimellitic acid, pyromellitic acid, 1,2,3,4-butanetetracarboxylic acid, benzophenone tetracarboxylic acid, and anhydrides thereof.

It is preferable for the amorphous polyester to contain 0.10 to 30.00 mol % of the isosorbide unit represented by the formula (3) based on all monomer units constituting the amorphous polyester, and is more preferable to contain 1.00 to 15.00 mol %. For information, the "monomer unit" refers to a form of a reacted monomer substance in a polymer.

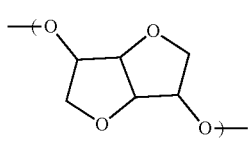

(3)

The amorphous polyester resin having the isosorbide unit of the above formula (3) has a strong phase separation property with the crystalline material. Because of this, in the toner of the present disclosure, it becomes easy for the crystalline material to migrate to the surface of the toner image in the fixing process, which is preferable. When 0.1 to 30.0 mol % of the unit of the formula (3) is contained in the amorphous polyester, the effect of the present disclosure tends to be easily obtained, which is more preferable.

In the present disclosure, the amorphous polyester containing the isosorbide unit represented by the formula (3) as a constituent component is prepared by the condensation of a divalent carboxylic acid or an anhydride thereof with an isosorbide represented by the following formula (4) and a divalent alcohol. Specifically, the amorphous polyester can be prepared by a method of dehydration condensation at a reaction temperature of 180 to 260° C. in a nitrogen atmosphere, at such a composition ratio that a carboxyl group remains. In addition, a monohydric or dihydric or higher alcohol other than the isosorbide represented by the following formula (4) may be used in combination, as needed. As the divalent alcohol, the materials described above can be used. In addition, it is also acceptable to use a monovalent or trivalent or higher carboxylic acid component or an anhydride thereof. As the above monovalent, divalent and trivalent carboxylic acids, the materials described above can be used.

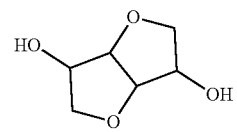

(4)

In addition, it is preferable that the SP value of the amorphous polyester is 11.60 to 12.40 $(J/cm^3)^{0.5}$.

(Colorant)

Examples of the colorant to be used in the present disclosure include the following organic pigments, organic dyes, and inorganic pigments.

Examples of cyan colorants include copper phthalocyanine compounds and derivatives thereof, anthraquinone compounds, and basic dye lake compounds.

Examples of magenta colorants include the following: condensed azo compounds, diketopyrrolopyrrole compounds, anthraquinones, quinacridone compounds, basic dye lake compounds, naphthol compounds, benzimidazolone compounds, thioindigo compounds and perylene compounds.

Examples of yellow colorants include condensed azo compounds, isoindolinone compounds, anthraquinone compounds, azo metal complexes, methine compounds and allylamide compounds.

Examples of black colorants include carbon black, and a colorant that is toned into black by use of the above yellow colorant, magenta colorant and cyan colorant, and a magnetic powder.

These colorants can be used solely or as a mixture or in a state of a solid solution. The colorant to be used in the present disclosure is selected in view of hue angle, chroma saturation, luminance, light resistance, OHP transparency, and dispersibility in the toner particle.

In the present disclosure, the content of the colorant is 1 to 10 parts by mass with respect to 100 parts by mass of the binder resin.

When the suspension polymerization method is used which is the preferable production method in the present disclosure, it is extremely preferable to use the colorant which has been subjected to the hydrophobizing treatment.

When the magnetic powder is used in the toner as the colorant in the present disclosure, the magnetic powder contains a magnetic iron oxide such as triiron tetroxide and γ-iron oxide as the main component, and may contain elements such as phosphorus, cobalt, nickel, copper, magnesium, manganese, aluminum and silicon. For the magnetic powder, it is preferable for a BET specific surface area by the nitrogen adsorption method to be 2 to 30 m$^2$/g, and is more preferable to be 3 to 28 m$^2$/g. In addition, it is preferable for the Mohs hardness to be 5 to 7. The shape of the magnetic powder includes a polyhedron, an octahedron, a hexahedron, a spherical shape, an acicular shape, and a scaly shape; and shapes having less anisotropy such as the polyhedron, the octahedron, the hexahedron, and the spherical shape are preferable for increasing the image density.

An amount of the colorant to be added is preferably 1 to 20 parts by mass with respect to 100 parts by mass of the binder resin or a polymerizable monomer constituting the binder resin. When the magnetic powder is used, the amount thereof is preferably 20 parts by mass or more and 200 parts by mass or less, and is more preferable to be 40 to 150 parts by mass, with respect to 100 parts by mass of the binder resin or the polymerizable monomer constituting the binder resin.

It is preferable that a number average particle size of the magnetic powder is 0.10 to 0.40 μm. In general, the smaller the particle size of the magnetic powder, the higher the coloring power, but it becomes easy for the magnetic powder to agglomerate; and the uniform dispersibility of the magnetic powder in the toner results in being poor, which is not preferable. In addition, if the number average particle size is smaller than 0.10 μm, the magnetic powder itself becomes reddish black, and accordingly in a halftone image, in particular, an image is formed in which reddishness is conspicuous, which cannot be said to be a high-quality image, which is not preferable. On the other hand, when the number average particle size exceeds 0.40 μm, the coloring power of the toner becomes insufficient, and uniform dispersion becomes difficult in the suspension polymerization method (which will be described later) which is a preferable method of producing the toner of the present disclosure, which is not preferable.

For information, the number average particle size of the magnetic powder can be measured using a transmission electron microscope. Specifically, toner particles to be observed are sufficiently dispersed in an epoxy resin, followed by curing in an atmosphere at a temperature of 40° C. for 2 days, to obtain a cured product. The obtained cured product is formed into a flake-shaped sample by a microtome, the sample is photographed with a transmission electron microscope (TEM) at a magnification of ten thousand to forty thousand, and diameters of 100 magnetic powder particles are measured in the field of view of the photograph. Then, the number average particle size is calculated, based on a diameter corresponding to a circle equivalent to a projected area of the magnetic powder. The particle size can also be measured with an image analyzing apparatus.

The magnetic powder to be used in the toner of the present disclosure can be produced, for example, in the following method. An aqueous solution containing ferrous hydroxide is prepared by addition of an alkali such as sodium hydroxide in an amount equivalent to the ferrous component or greater than the equivalent amount, to an aqueous solution of ferrous salt. Air is blown into the aqueous solution, while a pH-value of the prepared aqueous solution is maintained at pH of 7 or higher, an oxidation reaction of the ferrous hydroxide is carried out, while the aqueous solution is heated to 70° C. or higher, and a seed crystal is firstly produced that becomes a core of the magnetic iron oxide powder.

Next, an aqueous solution containing approximately one equivalent weight of ferrous sulfate, based on the amount of the alkali which has been added previously, is added to a slurry-like liquid containing the seed crystals. The reaction of the ferrous hydroxide is promoted while the pH of the liquid is maintained at 5 to 10, and air is blown into the liquid, and the magnetic iron oxide powder is grown around the seed crystal which functions as a core. At this time, the shape and magnetic properties of the magnetic powder can be controlled by arbitrarily selecting pH, a reaction temperature, and stirring conditions. As the oxidation reaction proceeds, the pH of the liquid shifts to an acidic side, but it is preferable not to leave the pH of the liquid to less than 5. The magnetic material thus obtained is filtered, washed and dried by a usual method, and the magnetic powder can be obtained.

In addition, when the toner is produced in an aqueous medium in the present disclosure, it is extremely preferable to subject the surface of the magnetic powder to the hydrophobizing treatment. When the surface is treated by a dry method, the magnetic powder which has been washed, filtered and dried is subjected to coupling agent treatment. In the case where the surface is treated by a wet method, the product is redispersed which has been dried after the completion of the oxidation reaction, or the iron oxide body obtained by washing and filtration after the completion of the oxidation reaction is redispersed in another aqueous medium without being dried; and the coupling treatment is performed. In the present disclosure, any of the dry method and the wet method can be appropriately selected.

Examples of the coupling agent that can be used in the surface treatment of the magnetic powder in the present disclosure include a silane coupling agent and a titanium coupling agent. The silane coupling agent is more preferably used and is represented by the general formula (I).

$$R_m SiY_n \qquad (I),$$

wherein R represents an alkoxy group, m represents an integer of 1 to 3, Y represents a functional group such as an alkyl group, a phenyl group, a vinyl group, an epoxy group and a (meth)acrylic group, and n represents an integer of 1 to 3, where m+n=4.

Examples of the silane coupling agent represented by the general formula (I) include: vinyl trimethoxy silane, vinyl triethoxy silane, vinyl tris(β-methoxyethoxy) silane, β-(3,4-epoxycyclohexyl) ethyl trimethoxy silane, γ-glycidoxypropyl trimethoxy silane, γ-glycidoxypropyl methyl diethoxy silane, γ-aminopropyl triethoxy silane, N-phenyl-γ-aminopropyl trimethoxy silane, γ-methacryloxypropyl trimethoxy silane, vinyl triacetoxy silane, methyl trimethoxy silane, dimethyl dimethoxy silane, phenyl trimethoxy silane, diphenyl dimethoxy silane, methyl triethoxy silane, dimethyl diethoxy silane, phenyl triethoxy silane, diphenyl diethoxy silane, N-propyl trimethoxy silane, isopropyl trimethoxy silane, n-butyl trimethoxy silane, isobutyl trimethoxy silane, trimethyl methoxy silane, n-hexyl trimethoxy silane, n-octyl trimethoxy silane, n-octyl triethoxy silane, n-decyl trimethoxy silane, hydroxypropyl trimethoxy silane, n-hexadecyl trimethoxy silane, and n-octadecyl trimethoxy silane. In the present disclosure, a silane coupling agent can be preferably used in which Y in the general formula (I) is an alkyl group. Among the alkyl groups, an alkyl group having 3 to 6 carbon atoms is preferable, and an alkyl group having 3 or 4 carbon atoms is particularly preferable.

In the case where the above silane coupling agent is used, the silane coupling agent can be used solely or in combination with a plurality of other types thereof for the treatment. When a plurality of types are used in combination, the coupling agents may be each individually used for the treatment, or may be simultaneously used for the treatment.

The total amount of the coupling agent to be used for the treatment is preferably 0.9 to 3.0 parts by mass with respect to 100 parts by mass of the magnetic powder, and it is important to adjust the amount of the treatment agent according to the surface area of the magnetic powder, the reactivity of the coupling agent, and the like.

In order to produce the toner of the present disclosure, it is preferable to enhance the affinity between the colorant and the crystalline material. When the silane coupling agent is used as the hydrophobizing treatment agent, the conditions of the treatment by the silane coupling agent for the colorant are appropriately adjusted in order to enhance the affinity with the crystalline material.

A specific method for adjusting $I_A/(I_A+I_B)/M_{Si}$ (expression (5)) will be described below.

When the silane coupling agent is used as the hydrophobizing treatment agent, in general, a silane compound obtained by hydrolyzation of the silane coupling agent under acidic conditions is subjected to a condensation reaction with a colorant under alkaline conditions. Furthermore, the above-described colorant is washed and dried, and a hydrophobized colorant can be obtained. In the case of hydrophobizing treatment in such a procedure, most of the hydrophobizing treatment agent is bonded to the colorant, the amount of the component condensed between the treatment agents becomes small, and accordingly, $I_A/(I_A+I_B)/M_{Si}$ becomes small.

In order to increase $I_A/(I_A+I_B)/M_{Si}$, the colorant is subjected to hydrophobizing treatment by use of the silane compound obtained by treating the silane coupling agent in advance under a condition in which a hydrolysis reaction and a condensation reaction tend to easily proceed simultaneously. Due to the hydrolysis and condensation of the silane coupling agent, which are simultaneously carried out, a silane compound is obtained that contains a large amount of oligomers which are formed by condensation between silane coupling agents. When the colorant is subjected to the hydrophobizing treatment using this silane compound, among the silane compounds, there exist a silane compound that directly bonds to the colorant, and a silane compound that is firstly condensed with another silane compound and of which the resultant terminal bonds to the colorant. Thus, the larger the amount of the condensed silane compound is, the higher the value of $I_A/(I_A+I_B)/M_{Si}$ becomes. The magnetic material obtained in this way exhibits high hydrophobicity, and can enhance the affinity with the crystalline material that has similarly the high hydrophobicity.

A preferable range of pH at the time when the silane compound is produced is 7.0 to 10.0, and a more preferable range is 8.0 to 9.5. A preferable range of pH at the time when the colorant is subjected to the hydrophobizing treatment using the silane compound is 7.0 to 11.0, and a more preferable range is 8.0 to 9.5.

(Crystalline Material)

The crystalline material will be described below. The crystalline material is not particularly limited, and known materials can be used. The crystalline material means a material that shows a clear melting point when having been measured using a differential scanning calorimeter (DSC).

In the present disclosure, it is preferable to use an ester wax, a hydrocarbon-based wax, or a crystalline polyester resin, from the viewpoint of low-temperature fixability and releasability.

The ester wax is a wax containing a fatty acid ester as a main component.

Preferable ester waxes will be described below. For information, the number of functional groups described below indicates the number of ester groups contained in one molecule. For example, behenyl behenate is referred to as a monofunctional ester wax, and dipentaerythritol hexabehenate is referred to as a hexafunctional ester wax.

The monofunctional ester wax is preferably a condensate of an aliphatic alcohol and an aliphatic carboxylic acid. At this time, the aliphatic carbon number is preferably 6 to 26.

Examples of the aliphatic alcohol include 1-hexanol, 1-heptanol, 1-octanol, 1-nonanol, 1-decanol, undecyl alcohol, and lauryl alcohol. In addition, examples of the aliphatic carboxylic acid include pentanoic acid, hexanoic acid, heptanoic acid, octanoic acid, nonanoic acid, and decanoic acid.

As a bifunctional ester wax, a combination of a dicarboxylic acid and a monoalcohol or a diol and a monocarboxylic acid can be used.

Examples of the dicarboxylic acid include adipic acid, pimelic acid, suberic acid, azelaic acid, sebacic acid, and dodecanedioic acid.

Examples of the diol include 1,6-hexanediol, 1,7-heptanediol, 1,8-octanediol, 1,9-nonanediol, 1,10-decanediol, 1,11-undecanediol, and 1,12-dodecanediol.

As the monoalcohol to be condensed with the dicarboxylic acid, an aliphatic alcohol is preferable. Specific examples thereof include tetradecanol, pentadecanol, hexadecanol, heptadecanol, octadecanol, nonadecanol, eicosanol, docosanol, tricosanol, tetracosanol, pentacosanol, hexacosanol, and octacosanol. Among the alcohols, docosanol is preferable from the viewpoint of fixability and developability.

As the monocarboxylic acid to be condensed with the diol, an aliphatic carboxylic acid is preferable. Specific examples include fatty acids such as lauric acid, myristic acid, palmitic acid, margaric acid, stearic acid, tuberculostearic acid, arachidic acid, behenic acid, lignoceric acid, and cerotic acid. Among the fatty acids, behenic acid is preferable from the viewpoint of the fixability and developability.

For information, examples of straight-chain fatty acids and straight-chain alcohols have been shown here, but the acids and alcohols may have each a branched structure.

The crystalline polyester resin will be described below. The crystalline polyester resin is not particularly limited, and known crystalline polyester resins can be used, but it is preferable to be saturated polyesters.

Furthermore, it is preferable that the crystalline polyester resin is a condensate of an aliphatic dicarboxylic acid, an aliphatic diol, and an aliphatic monocarboxylic acid and/or an aliphatic monoalcohol. It is more preferable that the crystalline polyester resin is a condensate of an aliphatic dicarboxylic acid, an aliphatic diol, and an aliphatic monocarboxylic acid. When the crystalline polyester resin contains the aliphatic monocarboxylic acid and/or the aliphatic monoalcohol as a constituent component, it becomes easy to adjust a molecular weight and/or a hydroxyl value of the crystalline polyester resin.

Examples of usable monomers are shown below.

Examples of the aliphatic dicarboxylic acid include oxalic acid, malonic acid, succinic acid, glutaric acid, adipic acid, pimelic acid, suberic acid, azelaic acid, sebacic acid, dodecanedioic acid, hexadecane dicarboxylic acid, and octadecane dicarboxylic acid.

Examples of the aliphatic diol include ethylene glycol, diethylene glycol, triethylene glycol, 1,2-propanediol, 1,3-propanediol, dipropylene glycol, trimethylene glycol, neopentyl glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,16-hexadecanediol, and 1,18-octadecanediol.

Examples of the aliphatic monocarboxylic acid include decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), and tetracosanoic acid (lignoceric acid).

Examples of the aliphatic monoalcohol include lauryl alcohol, stearyl alcohol, and behenyl alcohol.

By using such a monocarboxylic acid and a monoalcohol, a crystalline polyester resin having an alkyl group (preferably 2 or more and 24 or less carbon atoms) at the terminal can be obtained.

Here, because the monocarboxylic acid has one carboxylic acid, a structure derived from the monocarboxylic acid is positioned at a terminal of a molecular chain of the crystalline polyester resin.

It is preferable that a weight average molecular weight Mw of the crystalline polyester resin is 5000 or larger and 60000 or smaller.

The above crystalline polyester resin can be produced by an ordinary polyester synthesis method. For example, the crystalline polyester resin can be obtained by subjecting a dicarboxylic acid component and a diol component to an esterification reaction or a transesterification reaction, and then subjecting the resultant substance to a polycondensation reaction according to a conventional method under a reduced pressure or with nitrogen gas introduced.

The hydrocarbon-based wax is an aliphatic hydrocarbon-based wax, and examples thereof include low molecular-weight polyethylene, low molecular-weight polypropylene, microcrystalline wax, Fischer-Tropsch wax, paraffin wax, and polyolefin wax.

In the present disclosure, a plurality of crystalline materials can be used in combination. In this case, the SP value of the crystalline material detected as S2 is defined as SPc of the present disclosure.

(Binder Resin)

Examples of the binder resin that can be used in the toner of the present disclosure include: homopolymers of styrene or a substitution product thereof such as polystyrene and polyvinyltoluene; styrene-based copolymers such as styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, or styrene-maleic acid ester copolymer; and polymethyl methacrylate, polybutyl methacrylate, polyvinyl acetate, polyethylene, polypropylene, polyvinyl butyral, a silicone resin, a polyester resin, a polyamide resin, an epoxy resin, and a polyacrylic acid resin. These binder resins can be used solely or in combination with other one or more types. Among the binder resins, a styrene-acrylic resin represented by styrene-butyl acrylate is particularly preferable in terms of developing properties, the fixability and the like.

Examples of the polymerizable monomer that forms the above styrene-acrylic resin include the following substances.

Examples of a styrene-based polymerizable monomer include styrene-based polymerizable monomers such as styrene; α-methyl styrene, o-methyl styrene, m-methyl styrene, p-methyl styrene, and p-methoxy styrene.

Examples of an acrylic polymerizable monomer include acrylic polymerizable monomers such as methyl acrylate, ethyl acrylate n-propyl acrylate, iso-propyl acrylate, n-butyl acrylate, iso-butyl acrylate, tert-butyl acrylate, n-hexyl acrylate, 2-ethylhexyl acrylate, n-octyl acrylate, and cyclohexyl acrylate.

Examples of a methacrylic polymerizable monomer include methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-hexyl methacrylate, 2-ethylhexyl methacrylate, and n-octyl methacrylate.

For information, a method of producing the styrene-acrylic resin is not particularly limited, and known methods can be used. In addition, the binder resin may be used in combination with other known resins.

The toner of the present disclosure may use a charge control agent, in order to keep the chargeability of the toner stable regardless of the environment.

Examples of a negatively chargeable charge control agent include the following substances: a monoazo metal compound; an acetylacetone metal compound; metal compounds of an aromatic oxycarboxylic acid, an aromatic dicarboxylic acid, an oxycarboxylic acid and a dicarboxylic acid; an aromatic oxycarboxylic acid, aromatic monocarboxylic acid and polycarboxylic acid, and metal salts, anhydrides, and esters thereof; phenol derivatives such as bisphenol; urea derivatives; metal-containing salicylic acid-based compounds; metal-containing naphthoic acid-based compounds; boron compounds; quaternary ammonium salts; calixarenes; and resin-based charge control agents.

Examples of a positively chargeable charge control agent include the following substances: nigrosine and nigrosine modified products by fatty acid metal salts or the like; guanidine compounds; imidazole compounds; tributylbenzylammonium-1-hydroxy-4-naphthosulfonate; quaternary ammonium salts such as tetrabutylammonium tetrafluoroborate, and onium salts such as phosphonium salts which are analogs of the quaternary ammonium salts, and lake pigments thereof; triphenylmethane dyes and lake pigments thereof (where examples of laking agents are phosphotungstic acid, phosphomolybdic acid, phosphotungstic molybdic acid, tannic acid, lauric acid, gallic acid, ferricyanide and ferrocyanide); metal salts of higher fatty acids; diorganotin oxides such as dibutyltin oxide, dioctyltin oxide and dicyclohexyltin oxide; diorganotin borates such as dibutyltin borate, dioctyltin borate and dicyclohexyltin borate; and resin-based charge control agents.

These substances may be used solely or in combination with other one or more types.

Among the substances, as the charge control agent except the resin-based charge control agent, a metal-containing salicylic acid-based compound is preferable, and the metal thereof, in particular, is preferably aluminum or zirconium. A particularly preferable control agent is an aluminum salicylate compound.

As the resin-based charge control agent, it is preferable to use a polymer or copolymer which has a sulfonic acid group, a sulfonate group, a sulfonic acid ester group, a salicylic acid moiety, or a benzoic acid moiety.

The preferable amount of the charge control agent to be blended is 0.01 to 20 parts by mass, and more preferably 0.05 to 10 parts by mass, with respect to 10.0 parts by mass of the polymerizable monomer.

It is preferable for a weight average particle size (D4) of the toner which is produced by the present disclosure to be 4.0 to 11.0 μm, and is more preferable to be 5.0 to 10.0 μm.

When the weight average particle size (D4) is 4.0 to 11.0 μm, particularly satisfactory fluidity can be obtained, and the latent image can be faithfully developed.

(Method of Producing Toner)

The toner of the present disclosure can be produced by any of the known methods. Firstly, in the case of production by a pulverization method, components necessary as a toner, for example, such as a binder resin, a colorant, a wax, and in some cases, a charge control agent, and other additives are sufficiently mixed by a mixer such as a Henschel mixer or a ball mill. After that, the mixture is melted and kneaded using a thermal kneading machine such as a heating roll, a kneader or an extruder so that the toner material is dispersed or dissolved, the resultant material is cooled and solidified, is pulverized, then is classified, and is surface-treated, as needed. Thus, toner particles can be obtained. The classification and the surface treatment may be performed in any order. In the classification process, it is preferable to use a multi-division classifier, in view of production efficiency.

The pulverizing process can be carried out by a method that uses a known pulverizing apparatus such as a mechanical impact type or a jet type. In addition, it is preferable to perform pulverization by further applying heat, or to perform a process of applying auxiliary mechanical impact. In addition, it is also acceptable to employ a hot water bath method of dispersing finely pulverized (and classified as needed) toner particles in hot water, or a method of passing the toner particles through a hot air stream.

Examples of a unit of applying the mechanical impact force include a method of using a mechanical impact type pulverizer such as Kryptron System manufactured by Kawasaki Heavy Industries, Ltd., or Turbo Mill manufactured by Turbo Kogyo Co., Ltd. In addition, apparatuses can also be used such as a mechanofusion system manufactured by Hosokawa Micron Corporation, and a hybridization system manufactured by Nara Machinery Co., Ltd. These apparatuses adopt a method of centrifugally pressing the toner against the inside of a casing by a blade that rotates at a high speed, and applying a mechanical impact force to the toner by a force such as a compressive force or a frictional force.

When the toner of the present disclosure is produced by the pulverization method, it is necessary to carry out a process of forming a shell, in order to obtain a toner having a desired core-shell structure.

The toner of the present disclosure can also be produced by the pulverization method as has been described above. However, it is necessary to produce the toner of the present disclosure so that a certain amount of the crystalline material exists on the surface of the toner and a shell is formed from an amorphous resin having a large difference between the SP values, and accordingly, it is preferable to produce the toner in an aqueous medium.

In the case where the toner is produced by the emulsion aggregation method, there is a problem that when the crystalline material is aggregated so as to be exposed to the surface of the toner, and an amorphous resin that has a large difference in the SP value from the crystalline material is used, the formation of the shell is hindered. In order to solve this problem, the shell is formed by coagulating a small amount of an amorphous resin that has a relatively small difference in the SP value from the crystalline material on the surface of the toner, and then using another amorphous resin that has a relatively large difference in the SP value; and thereby the toner of the present disclosure can be obtained.

The suspension polymerization method will be described below.

The suspension polymerization method is a method of: obtaining a polymerizable monomer composition by uniformly dissolving or dispersing a polymerizable monomer and a colorant (and further a polymerization initiator, a crosslinking agent, a charge control agent and other additives, as needed); after that, obtaining a toner having a desired particle size by dispersing the polymerizable monomer composition in continuous layers (for example, aqueous phase) which contain a dispersing agent, using an appropriate stirrer; and polymerizing the composition at the same time. In the toner obtained by the suspension polymerization method (hereinafter, also referred to as "polymerized toner"), the shape of individual toner particles is substantially spherical, and the distribution of the amount of charge is also relatively uniform; and accordingly, an image quality can be expected to be enhanced.

Examples of the polymerizable monomer constituting the polymerizable monomer composition, in the production of the polymerization toner according to the present disclosure, include the following substances.

Examples of the polymerizable monomer include: styrene-based monomers such as styrene, o-methylstyrene, m-methylstyrene, p-methylstyrene, p-methoxystyrene and p-ethylstyrene; acrylic acid esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate, and phenyl acrylate; methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; and other monomers such as acrylonitrile, methacrylonitrile and acrylamide. These monomers can be used solely, or as a mixture thereof. Among the above-described monomers, it is preferable to use styrene solely or as a mixture with other monomers, in view of the developing properties and the durability of the toner.

It is preferable that the half-life at the time of the polymerization reaction of a polymerization initiator to be used in the production of the toner of the present disclosure by the polymerization method is 0.5 to 30 hours. In addition, when the polymerization reaction is carried out by the use of the polymerization initiator in an addition amount of 0.5 to 20 parts by mass with respect to 100 parts by mass of the polymerizable monomer, a polymer having a maximum molecular weight in between 5,000 and 50,000 is obtained, and can give a desired strength and suitable melting properties to the toner.

Specific examples of the polymerization initiator include: azo or diazo polymerization initiators such as 2,2'-azobis- (2,4-dimethylvaleronitrile), 2,2'-azobisisobutyronitrile, 1,1'-azobis(cyclohexane-1-carbonitrile), 2,2'-azobis-4-methoxy-2,4-dimethyl valeronitrile, and azobis isobutyronitrile; and peroxide-based polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butylperoxy-2-ethyl hexanoate, and t-butylperoxy pivalate.

When the toner of the present disclosure is produced by the polymerization method, a crosslinking agent may be added. By increase of the amount of the crosslinking agent, the viscosity of the toner at 120° C. in the present disclosure can be enhanced. A preferable amount to be added is 0.001 to 15 parts by mass with respect to 100 parts by mass of the polymerizable monomer.

Here, as the crosslinking agent, chemical compounds having two or more polymerizable double bonds are mainly used, and examples thereof include: aromatic divinyl compounds such as divinyl benzene and divinyl naphthalene; carboxylic acid esters having two double bonds, such as ethylene glycol diacrylate, ethylene glycol dimethacrylate, 1,3-butanediol dimethacrylate; divinyl compounds such as divinylaniline, divinyl ether, divinyl sulfide, and divinyl sulfone; and chemical compounds having three or more vinyl groups. These substances are used solely, or as a mixture of two or more types thereof.

In the method of producing the toner of the present disclosure by the polymerization method, generally, the above-described toner composition and the like are appropriately added; a polymerizable monomer composition is prepared which is uniformly dissolved or dispersed by a dispersing machine such as a homogenizer, a ball mill or an ultrasonic dispersing machine; and the polymerizable monomer composition is suspended in an aqueous medium containing a dispersing agent. At this time, it is better to use a high-speed dispersing machine such as a high-speed stirrer or an ultrasonic dispersing machine to control the size of the toner particles to a desired size at a dash, and then the particle size of the obtained toner particles becomes sharper. As for the timing of the addition of the polymerization initiator, the polymerization initiator may be added at the same time when other additives are added to the polymerizable monomer, or may be mixed immediately before other additives are suspended in the aqueous medium. In addition, it is also possible to add the polymerization initiator that has been dissolved in a polymerizable monomer or a solvent, immediately after granulation and before the polymerization reaction is started.

After the granulation, it is acceptable to carry out stirring in such an extent that the state of the particles is maintained and the particles are prevented from floating and settling, by use of an ordinary stirrer.

When the toner of the present disclosure is produced, known surfactants, organic dispersing agents and inorganic dispersing agents can be used as a dispersing agent. Among the dispersing agents, inorganic dispersing agents can be preferably used, because the agents resist producing a harmful ultrafine powder, resist losing the stability even when the reaction temperature has been changed because of acquiring dispersion stability due to the steric hindrance, are easily washed, and resist giving adverse effects on the toner. Examples of such inorganic dispersing agents include: polyvalent metal phosphates such as tricalcium phosphate, magnesium phosphate, aluminum phosphate, zinc phosphate and hydroxyapatite; carbonates such as calcium carbonate and magnesium carbonate; inorganic salts such as calcium metasilicate, calcium sulfate and barium sulfate; and inorganic compounds such as calcium hydroxide, magnesium hydroxide and aluminum hydroxide.

It is desirable to use the inorganic dispersing agent in an amount of 0.2 to 20 parts by mass with respect to 100 parts by mass of the polymerizable monomer. In addition, the above dispersing agents may be used solely, or in combination with other one or more types thereof. Furthermore, 0.001 to 0.1 parts by mass of a surfactant may be used in combination.

When these inorganic dispersing agents are used, the agents may be used as they are, but in order to obtain finer particles, can be used in a form of particles of the inorganic dispersing agent, which have been produced in an aqueous medium. For example, in the case of tricalcium phosphate, the tricalcium phosphate can produce water-insoluble calcium phosphate by being mixed with an aqueous solution of sodium phosphate and an aqueous solution of calcium chloride under high-speed stirring, and can be more uniformly and finely dispersed. At this time, a water-soluble sodium chloride salt is produced as a by-product at the same time, but the production is more convenient, because when the water-soluble salt exists in the aqueous medium, the salt suppresses the dissolution of the polymerizable monomer into water, and resists producing the toner of ultrafine particle by emulsion polymerization.

Examples of the surfactant include: sodium dodecylbenzene sulfate, sodium tetradecyl sulfate, sodium pentadecyl sulfate, sodium octyl sulfate, sodium oleate, sodium laurate, sodium stearate, and potassium stearate.

In the process of polymerizing the above polymerizable monomer, the polymerization temperature is set to 40° C. or higher, generally to 50° C. to 90° C.

In the case where the toner having the core-shell structure of the present disclosure is produced, if the amorphous thermoplastic resin is used that has a large difference in the SP value from the crystalline material, it becomes easy for the crystalline material to be encapsulated inside the toner. As a result, there arises a problem that the S2 tends to easily become less than 1%. In order to solve this problem, such a material is simultaneously used as to have a high affinity with the crystalline material and also tend to be unevenly distributed in the vicinity of the surface of the toner, and thereby it becomes easy to attain the expression (1) and expression (2) of the present disclosure. Specifically, in order to produce the toner of the present disclosure by the suspension polymerization method, it is preferable to use a hydrophobized magnetic material or a hydrophobized pigment. In order to enhance the affinity with the crystalline material, it is particularly preferable to use a hydrophobized magnetic material which shows a high value of $I_A/(I_A+I_B)/M_{Si}$. The magnetic material has a certain degree of hydrophilicity even if having been subjected to the hydrophobizing treatment, and because of this, when the toner is produced by the suspension polymerization method, the magnetic material is unevenly distributed in the vicinity of the surface of the toner. Furthermore, when the treated magnetic material is used that shows a high value of $I_A/(I_A+I_B)/M_{Si}$, the crystalline material tends to easily exist in the vicinity of the magnetic material. As a result, the crystalline material also tends to easily exist in the vicinity of the surface. For this reason, even when the amorphous thermoplastic resin has been used that has a large difference in the SP value from the crystalline material, the S2 can be controlled within the range of the present disclosure, and accordingly the toner having the core-shell structure of the present disclosure can be obtained.

The obtained polymer particle is filtered, washed and dried by known methods, and the toner particle is obtained. The toner of the present disclosure can be obtained, by mixing the toner particle with such an inorganic fine powder as to be described later, as needed, and causing the inorganic fine powder to adhere to the surface of the toner particle. In addition, it is also possible to add a classification process into the production process (before the inorganic fine powder is mixed), and to remove a coarse powder and a fine powder contained in the toner particles.

The toner of the present disclosure is obtained by mixing the toner particles obtained by the above-described production method with an additive such as a fluidizing agent, as needed, and is thus produced as the toner. As for the mixing method, a known method can be used, and for example, a Henschel mixer is an apparatus that can be preferably used.

In the toner of the present disclosure, it is a preferable form that an inorganic fine powder having a number average primary particle size of 4 to 80 nm, more preferably 6 to 40 nm, is added as a fluidizing agent to the toner particles. The inorganic fine powder is added for the purpose of improving the fluidity of the toner and uniformizing the electric charge of the toner particles, but it is also a preferable form to impart functions such as adjustment of the amount of charge of the toner and enhancement of environmental stability, by subjecting the inorganic fine powder to the hydrophobizing treatment. The number average primary particle size of the inorganic fine powders is measured with a method using a photograph of the toner, which has been magnified by a scanning electron microscope and has been shot.

As the inorganic fine powder to be used in the present disclosure, silica, titanium oxide, alumina and the like can be used. As the silica fine powder, both of the following silicas can be used. One is dry silica that is referred to as so-called dry method silica or fumed silica which is produced, for example, by vapor phase oxidation of a silicon halide, and another one is so-called wet silica which is produced from water glass or the like. However, the dry silica is more preferable which contains less silanol groups on the surface and in the inside of the silica fine powder, and less production residues such as $Na_2O$ and $SO_3^2$. In addition, in the case of dry silica, it is also possible to obtain a composite fine powder of silica and another metal oxide, by using, for example, another metal halogen compound such as aluminum chloride or titanium chloride, together with a silicon halogen compound in the production process; and the dry silica includes the composite fine powders.

It is preferable that the amount of the inorganic fine powder to be added which has a number average primary particle size from 4 to 80 nm is 0.1 to 3.0% by mass with respect to the toner particles. When the amount added is less than 0.1% by mass, the effect is not sufficient, and when the amount added is 3.0% by mass or more, the fixability becomes poor. The content of the inorganic fine powder can be quantified by use of fluorescent X-ray analysis, and by use of a calibration curve prepared from a standard sample.

In the present disclosure, it is preferable that the inorganic fine powder has been subjected to the hydrophobizing treatment, because environmental stability of the toner can be enhanced. When the inorganic fine powder added to the toner absorbs moisture, the amount of charge of the toner particle significantly decreases, the amount of charge tends to easily become uneven, and scattering of the toner tends to easily occur. Examples of the treatment agent to be used for the hydrophobizing treatment of the inorganic fine powder include silicone varnishes, various modified silicone varnishes, silicone oils, various modified silicone oils, silane compounds, silane coupling agents, other organosilicon compounds, and organotitanium compounds. These treatment agents may be used solely, or in combination with other one or more types thereof.

The toner of the present disclosure can also further contain a small amount of other additives within such a range as not to substantially give adversely effect on the toner, as a developing property enhancing agent, which include: lubricant powders such as, for example, fluororesin powder, zinc stearate powder, and polyvinylidene fluoride powder; abrasives such as cerium oxide powder, silicon carbide powder, and strontium titanate powder; fluidity-imparting agents such as, for example, titanium oxide powder and aluminum oxide powder; anti-caking agents; or organic fine particles and inorganic fine particles having reverse polarity. These additives can also subject the surfaces to hydrophobizing treatment, and then be used.

Next, one example of an electrophotographic image forming apparatus which can preferably use the toner of the present disclosure will be specifically described with reference to FIG. 1. In FIG. 1, reference numeral 100 denotes a photosensitive drum, around which a primary charging roller 117, a developing device 140 including a developing sleeve 102 and a stirring member 141 having a developing blade 103, a transfer charging roller 114, a cleaner 116, a registration roller 124 and the like are provided. The photosensitive drum 100 is charged to, for example, −600 V (applied voltages are, for example, an AC voltage of 1.85 kVpp and a DC voltage of −620 Vdc) by the primary charging roller 117. Then, the laser generating apparatus 121 irradiates the photosensitive drum 100 with laser light 123 to thereby expose the photosensitive drum 100 to the light, and an electrostatic latent image corresponding to a target image is formed thereon. The electrostatic latent image on the photosensitive drum 100 is developed by a one component toner by the developing device 140 to obtain a toner image, and the toner image is transferred onto a transfer material by the transfer roller 114 that abuts on the photosensitive drum 100 via the transfer material. The transfer material on which the toner image is placed is conveyed to a fixing device 126 by a conveying belt 125 and the like, and the toner image is fixed on the transfer material. In addition, the toner that has been partially left on the photoreceptor is cleaned by the cleaner 116.

Here, the image forming apparatus is shown which is for the magnetic one component jumping development, but the image forming apparatus may be used in any method of the jumping development and the contact development.

Next, a method for measuring each physical property of the toner of the present disclosure will be described.

(Measurement of Melting Point of Crystalline Material)

The melting point of the crystalline material can be determined as a peak top temperature of an endothermic peak at the time when having been measured by DSC. The crystalline material is isolated from the toner by the above method, as needed. The measurement is carried out according to ASTM D3417-99. For these measurements, DSC-7 manufactured by Perkin Elmer, DSC2920 manufactured by TA Instruments Inc., and Q1000 manufactured by TA Instruments Inc. can be used, for example. The melting points of indium and zinc are used for the temperature correction of a detecting section of the apparatus, and the heat of fusion of indium is used for the correction of the amount of heat. An aluminum pan is used for a measurement sample, an empty pan is set as a control, and the temperature is measured.

(Measurement of Weight Average Particle Size (D4) and Number Average Particle Size (D1) of Toner (Particles))

The weight average particle size (D4) and the number average particle size (D1) of the toner (particles) are measured using a precision particle size distribution measuring apparatus "Coulter Counter Multisizer 3" (registered trademark, manufactured by Beckman Coulter, Inc.) equipped with a 100 μm aperture tube by a pore electric resistance method, and a dedicated software "Beckman-Coulter Multisizer 3 Version 3.51" (manufactured by Beckman Coulter Inc.) which is attached for setting measurement conditions and analyzing measurement data, through 25,000 channels that are the number of effective measurement channels; and the measurement data is analyzed, and the particle sizes are calculated.

As an electrolytic aqueous solution to be used for the measurement, a solution prepared by dissolving guaranteed grade sodium chloride in ion-exchanged water so as to have a concentration of approximately 1% by mass, for example, "ISOTON II" (produced by Beckman Coulter, Inc.) can be used.

For information, the dedicated software is set in the following way, before the measurement and analysis are performed.

In the "screen of changing standard operation method (SOM)" in the dedicated software, the total count number in the control mode is set to 50000 particles, the number of measurements is set to 1, and the Kd value is set to a value obtained using "Standard particle 10.0 μm" (produced by Beckman Coulter, Inc.). The threshold and the noise level are automatically set by pressing a measurement button of threshold/noise level. In addition, the current is set to 1600 μA, the gain is set to 2, the electrolytic solution is set to ISOTON II, and the flush of the aperture tube after measurement is checked.

In the "screen for setting conversion from pulse to particle size" of the dedicated software, a bin interval is set to a logarithmic particle size, a particle size bin is set to 256 particle size bins, and a particle size range is set to 2 to 60 μm.

A specific measurement method is as follows.

(1) Approximately 200 ml of the electrolytic aqueous solution is charged into a 250 ml round-bottomed beaker made from glass, which is dedicated to Multisizer 3, the beaker is set on a sample stand, and a stirrer rod is rotated counterclockwise at 24 rotation/second to stir the solution. Then, dirt and air bubbles in the aperture tube are removed, by the "aperture flush" function of the analysis software.

(2) Approximately 30 ml of the electrolytic aqueous solution is charged into a 100 ml flat-bottomed beaker made from glass, and approximately 0.3 ml of a diluted solution is added thereto which has been obtained by diluting "Contaminon N" (10% by mass aqueous solution of a neutral detergent for cleaning the precision measuring device, which is formed of a nonionic surfactant, an anionic surfactant and an organic builder, and has a pH of 7; and produced by Wako Pure Chemical Industries, Ltd.) as a dispersing agent, with ion-exchanged water to 3 times by mass.

(3) A predetermined amount of ion-exchanged water is charged into a water tank of an ultrasonic dispersion device "Ultrasonic Dispersion System Tetora 150" (manufactured by Nikkaki Bios Co., Ltd.) which houses two oscillators having an oscillation frequency of 50 kHz in a state in which the phases are shifted by 180 degrees, and has an electrical output of 120 W, and approximately 2 ml of the Contaminon N is added to the water tank.

(4) The beaker of (2) is set in a beaker fixing hole of the ultrasonic dispersion device, and the ultrasonic dispersion device is operated. Then, a height position of the beaker is adjusted so that a resonance state of the liquid surface of the electrolytic aqueous solution in the beaker becomes maximum.

(5) In a state in which the electrolytic aqueous solution in the beaker of (4) is irradiated with ultrasonic waves, approximately 10 mg of the toner (particles) is added little by little into the electrolytic aqueous solution, and is dispersed therein. Then, the ultrasonic dispersion treatment is further continued for 60 seconds. For information, in the ultrasonic dispersion, a water temperature in the water tank is appropriately adjusted to 10 to 40° C.

(6) The electrolytic aqueous solution of (5), in which the toner (particles) has been dispersed, is added dropwise into the round bottom beaker of (1) using a pipet, which has been placed in the sample stand, and the measurement concentration is adjusted so as to become approximately 5%. Then, measurement is performed until the number of particles to be measured reaches 50000.

(7) The measurement data is analyzed by the dedicated software attached to the apparatus, and the weight average particle size (D4) is calculated. For information, the "average size" on a screen of analysis/volume statistical value (arithmetic average) at the time when graph/volume % has been set in the dedicated software is the weight average particle size (D4), and the "average size" on a screen of analysis/number statistical value (arithmetic average) at the time when the graph/number % has been set in the dedicated software is the number average particle size (D1).

(Method for Measuring Molecular Weight of Crystalline Material)

Molecular weights of the crystalline material and the amorphous thermoplastic resin are measured by gel permeation chromatography (GPC) in the following way.

Firstly, a specimen is dissolved in tetrahydrofuran (THF) at room temperature. Then, the obtained solution is filtered through a solvent-resistant membrane filter "MySyori Disk" (manufactured by Tosoh Corporation) having a pore diameter of 0.2 μm, and a sample solution is obtained. For information, the sample solution is adjusted so that the concentration of a component soluble in THE becomes 0.8% by mass. Measurement is conducted using this sample solution under the following conditions.

Apparatus: high-speed GPC apparatus "HLC-8220GPC" [manufactured by Tosoh Corporation]
Column: duplicate of LF-604
Eluent: THF
Flow rate: 0.6 ml/min
Oven temperature: 40° C.
Volume of sample to be injected: 0.020 ml When the molecular weight of the sample is calculated, the molecular weight calibration curve is used which has been prepared by use of standard polystyrene resins (for example, trade name "TSK standard polystyrene F-850, F-450, F-288, F-128, F-80, F-40, F-20, F-10, F-4, F-2, F-1, A-5000, A-2500, A-1000 and A-500", produced by Tosoh Corporation).

(Measurement of Glass Transition Temperature of Resin and Toner)

The glass transition temperatures (Tg) of the amorphous thermoplastic resin and the toner are measured according to ASTM D3418-82 using a differential scanning calorie analysis apparatus "Q1000" (TA Instruments Inc.).

The melting points of indium and zinc are used for the temperature correction of a detecting section of the apparatus, and the heat of fusion of indium is used for the correction of the amount of heat.

As a measurement sample, 3.0 mg of an amorphous saturated polyester resin or the toner is precisely weighed.

This sample is charged into an aluminum pan, and measurement is performed using an empty aluminum pan as a reference, in a measurement temperature range of 30° C. to 200° C., at a temperature rising rate of 10° C./min, under normal temperature and normal humidity.

In this temperature rising process, the specific heat changes in a temperature range of 40° C. to 100° C. The glass transition temperature (Tg) is defined as the intersection of the differential thermal curve and a line at the midpoint between the baselines before and after the appearance of the change in the specific heat, at the time.

<Method for Measuring SP Value>

The SP value that is used in the present disclosure is calculated from the type and ratio of monomers constituting the resin, by a generally used Fedors method [Poly. Eng. Sci., 14 (2) 147 (1974)]. The SP value can be controlled by the type and amount of the monomers. In order to increase the SP value, for example, a monomer having a large SP value may be used. On the other hand, in order to reduce the SP value, for example, a monomer having a small SP value may be used. The unit of the SP value in the present disclosure is $(cal/cm^3)^{0.5}$.

<Method for Calculating Ratio S2 of Area Occupied by Crystalline Material>

S2(%) of a ratio of the area occupied by the crystalline material per the area of the toner is calculated by use of an image that has been obtained by observing a toner which has been dyed in a $RuO_4$ gas atmosphere of 500 Pa using a vacuum electronic staining apparatus (Filgen, VSC4R1H) for 15 minutes, by a backscattered electron image using a field emission scanning electron microscope S-4800 (Hitachi High-Technologies Corporation).

Liquid nitrogen is injected into an anti-contamination trap that is attached to a housing of S-4800 until the liquid nitrogen overflows, and the anti-contamination trap is left for 30 minutes. The "PC-SEM" in S-4800 is activated, and flushing (cleaning of FE chip of the electron source) is carried out. An acceleration voltage display portion on the control panel on the screen is clicked, the [Flushing] button is pressed, and the flushing execution dialog is opened. It is confirmed that the flushing intensity is 2, and the flushing is executed. It is confirmed that an emission current by flushing is 20 to 40 µA. The sample holder is inserted into a sample chamber in the S-4800 housing. The [Origin] on the control panel is pressed, and the sample holder is moved to the observation position.

The acceleration voltage display portion is clicked to open an HV setting dialog, and the acceleration voltage is set to [5.0 kV] and the emission current is set to [20 µA]. In the [Basic] tab on the operation panel, the signal selection is set to [SE], [Upper (U)] and [+BSE] are selected in an SE detector, [L.A.100] is selected in a selection box in the right of [+BSE], and a mode for observing the backscattered electron image is set. Similarly, in the [Basic] tab in the operation panel, a probe current in an electron optical system condition block is set to [Normal], a focus mode is set to [UHR], and WD is set to [3.0 mm]. An [ON] button in an acceleration voltage display portion on a control panel is pressed, and an acceleration voltage is applied. The domain of the crystalline material observed black under the above observation conditions is focused, and the SEM image is stored.

A ratio of the area occupied by the crystalline material is calculated using image processing software "Image-Pro Plus (manufactured by MediaCybernetics)" for the obtained image.

The ratio of the area occupied by the crystalline material is calculated on 100 toner particles. The ratio of the area occupied by the crystalline material shall be a ratio of the area of the crystalline material per the area of the toner.

<Method for Measuring Viscosity of Toner>

A melt viscosity of the above toner at a temperature of 120° C. is a value determined from a viscosity value of the toner using a flow tester temperature rising method. As an apparatus, a flow tester CFT-500D (manufactured by Shimadzu Corporation) is used, and the viscosity is measured under the following conditions.

Sample: approximately 1.1 g of the toner is weighed, is molded by a pressure molding machine, and the mold is used as a sample.

Die hole diameter: 0.5 mm, die length: 1.0 mm, and cylinder pressure: $9.807 \times 10^5$ (Pa)

Measurement mode: temperature rising method

Temperature rising rate: 4.0° C./min

The viscosity of the toner at a temperature of 50° C. to 200° C. is measured according to the above method, and the viscosity at a temperature of 120° C. is determined.

In addition, using the toner of the present disclosure, a process cartridge can be obtained that contributes to the formation of an electrophotographic image excellent in the low-temperature fixability, the durability, and the capability of preventing the contamination of the conveying member. In addition, using the toner of the present disclosure, an electrophotographic image forming apparatus can be obtained that can form the electrophotographic image excellent in the low-temperature fixability, the durability and the capability of preventing the contamination of the conveying member.

EXAMPLES

The present disclosure will be described below in more detail with reference to Production Examples and Examples, but these do not limit the present disclosure in any way. For information, in the following formulations, the number of parts all indicate by mass.

Production Example of Magnetic Material 1

(Production of Magnetic Iron Oxide)

An aqueous solution containing ferrous hydroxide was prepared by mixing a solution of 1.00 to 1.10 equivalent amounts of sodium hydroxide with respect to iron element, 0.15% by mass of $P_2O_5$ with respect to iron element in terms of phosphorus element, and 0.50% by mass of $SiO_2$ with respect to iron element in terms of silicon element, in an aqueous solution of ferrous sulfate. The pH of the aqueous solution was adjusted to 8.0, while air is blown thereinto, and an oxidation reaction was carried out at 85° C.; and a slurry liquid having seed crystals was prepared.

Subsequently, an aqueous solution of ferrous sulfate was added to the slurry liquid so as to have become 0.90 to 1.20 equivalent amounts to the initial alkali amount (sodium content in sodium hydroxide); then, while the resultant slurry liquid was maintained at a pH of 7.6, and air was blown thereinto, the oxidation reaction was promoted; and a slurry liquid containing iron oxide was obtained.

(Production of Silane Compound)

Iso-Butyl trimethoxy silane in an amount of 30 parts by mass was added dropwise to 70 parts by mass of ion-exchanged water which was being stirred. After that, this aqueous solution was kept at a pH of 9.0 and a temperature of 45° C., and the iso-butyl trimethoxy silane was dispersed for 120 minutes at a peripheral speed of 0.46 m/s using a Disper blade, and hydrolytic and condensation reactions were promoted. After that, the pH was adjusted to 9.0, the liquid was immediately cooled to 10° C., and the hydrolysis and condensation reactions were stopped. Thus, a liquid containing a silane compound was obtained. Here, the pH level (pH1) was 9.0, at which the hydrolytic and condensation reactions of the silane coupling agents were promoted.

(Production of Magnetic Material 1)

While the above-described slurry liquid containing the iron oxide was dispersed with a pin mill, a liquid was added into the slurry liquid which contained 4.7 parts by mass of the above-described silane compound with respect to 100 parts by mass of the magnetic iron oxide. At this time, the mixture was kept at a pH of 9.0 and a temperature of 55° C., the iron oxide was dispersed for 60 minutes, and the hydrophobizing treatment for the magnetic material was promoted. After that, the above-described dispersion liquid was filtered using a filter press, and the residue was washed with a large amount of water. Furthermore, the residue was dried at 120° C. for 2 hours, and obtained particles were subjected to disintegration treatment and then were passed through a sieve having an opening of 100 μm; and a magnetic material 1 was obtained which had a number average particle size of 230 nm. Here, a pH level (pH2) was 9.0, at which the reaction of the silane compound with the magnetic material was promoted.

Production Examples of Magnetic Materials 2 to 5

Magnetic materials 2 to 5 were obtained with the same apparatuses and under the same conditions as in the case where the magnetic material 1 was produced, except that the hydrophobizing treatment agent and treatment conditions (treatment method, pH1 and pH2) were changed to the conditions shown in Table 1.

Production Example of Amorphous Thermoplastic Resin 1

A mixture in an amount of 100 parts by mass, in which raw material monomers other than trimellitic anhydride were mixed in the amounts of charge shown in the following Table 2, and 0.52 parts by mass of tin di(2-ethylhexanoate) which was a catalyst were charged into a polymerization tank equipped with a nitrogen inlet line, a dehydration line and a stirrer. Next, after the inside of the polymerization tank was set to a nitrogen atmosphere, the mixture was subjected to a polycondensation reaction for 6 hours while being heated at 200° C. Furthermore, after the mixture was heated to 210° C., trimellitic anhydride was added thereto; and the pressure in the polymerization tank was reduced down to 40 kPa, and the resultant mixture was further subjected to the condensation reaction. The sp value and molecular weight of the obtained resin were as shown in Table 2. This resin is designated as an amorphous thermoplastic resin 1.

For information, the "isosorbide" in the Table is a compound having a structure of the above formula (4).

Production Examples of Amorphous Thermoplastic Resins 2 to 9

Amorphous thermoplastic resins 2 to 9 were produced in the same operation as in the amorphous thermoplastic resin 1, except that the raw material monomers shown in the following Table 2 were charged in the respective amounts. At this time, sampling and measurement were carried out sequentially, and when the molecular weight reached a desired value, the polymerization reaction was stopped; and the resin was taken out from the polymerization tank. The physical properties of the obtained resins are shown in the following Table 2. For information, in the production of the amorphous thermoplastic resin 8, a mixture was used as BPA, which contained a 3 mole propylene oxide adduct of bisphenol A and a 2 mole ethylene oxide adduct of bisphenol A at a molar ratio of 45.0 to 44.2. In the production of the amorphous thermoplastic resin 9, a mixture was used as BPA, which contained the 3 mole propylene oxide adduct of bisphenol A and the 2 mole ethylene oxide adduct of bisphenol A at a molar ratio of 29.8 to 33.0. When BPA was not specified, the 3 mole propylene oxide adduct of bisphenol A was used.

TABLE 1

|  | Hydrophobizing treatment condition | | Hydrophobizing | Physical properties | | |
| --- | --- | --- | --- | --- | --- | --- |
|  | Treatment method | pH1 | pH2 | treatment agent | Carbon number of alkyl substituent | Average primary particle size (nm) | NEXAFS value |
| Magnetic material 1 | Wet method | 9.0 | 9.0 | iso-Butyl trimethoxy silane | 4 | 260 | 47 |
| Magnetic material 2 | Wet method | 8.7 | 9.0 | n-Hexyl trimethoxy silane | 6 | 260 | 40 |
| Magnetic material 3 | Wet method | 10.0 | 9.0 | n-Hexyl trimethoxy silane | 6 | 260 | 50 |
| Magnetic material 4 | Wet method | 9.0 | 9.0 | n-Octyl trimethoxy silane | 8 | 260 | 39 |
| Magnetic material 5 | Wet method | 10.0 | 9.0 | Ethyl trimethoxy silane | 2 | 260 | 58 |
| Magnetic material 6 | Wet method | 5.5 | 5.5 | iso-Butyl trimethoxy silane | 4 | 210 | 30 |
| Magnetic material 7 | Wet method | 5.5 | 7.0 | iso-Butyl trimethoxy silane | 4 | 230 | 34 |

TABLE 2

|  |  |  | Amorphous thermoplastic resin 1 | Amorphous thermoplastic resin 2 | Amorphous thermoplastic resin 3 | Amorphous thermoplastic resin 4 | Amorphous thermoplastic resin 5 | Amorphous thermoplastic resin 6 | Amorphous thermoplastic resin 7 | Amorphous thermoplastic resin 8 | Amorphous thermoplastic resin 9 |
|---|---|---|---|---|---|---|---|---|---|---|---|
| Resin composition (molar ratio) | Acid | TPA | 91 | 64 | 63 | 81 | 64 | 40 | 63 | 45 | 45.2 |
|  |  | IPA | 0 | 35 | 34 | 0 | 35 | 60 | 34 | 44.2 | 44 |
|  |  | TMA | 0.5 | 0 | 3 | 0.5 | 0 | 10 | 3 | 1.3 | 1.3 |
|  | Alcohol | BPA | 58 | 60 | 31 | 58 | 61 | 50 | 24 | 80 | 62.8 |
|  |  | EG | 36 | 38 | 8 | 36 | 38 | 8 | 8 | 0 | 0 |
|  |  | Isosorbide | 4 | 0.2 | 60 | 4 | 0 | 0 | 60 | 20 | 37.2 |
| Physical properties of resin | Mol % of isosorbide unit |  | 2.1 | 0.1 | 30 | 2 | 0 | 0 | 30 | 10.5 | 19.53 |
|  | Weight average molecular weight Mw |  | 12100 | 10800 | 9700 | 10000 | 12300 | 9800 | 10000 | 12000 | 12300 |
|  | SP value |  | 11.68 | 11.69 | 12.39 | 11.6 | 11.67 | 11.13 | 12.6 | 11.21 | 11.47 |

The notation of the monomer composition indicates a molar ratio at the time when the total number of moles of the alcohol component is 100.

The abbreviations in the above Table each show the followings.

TPA: terephthalic acid,
IPA: isophthalic acid,
TMA: trimellitic acid,
BPA: bisphenol A, and
EG: ethylene glycol.

Production Example of Toner 1

An aqueous solution of 0.1 mol/L $Na_3PO_4$ in an amount of 850 parts by mass was added to a vessel equipped with a high-speed stirring apparatus CLEARMIX (manufactured by M-Technique co., Ltd.), and the solution was heated to 60° C. while being stirred at a rotation peripheral speed of 33 m/s. Into the solution, 68 parts by mass of an aqueous solution of 1.0 mol/L $CaCl_2$) was added, and an aqueous medium was prepared which contained a fine poorly water-soluble dispersing agent $Ca_3(PO_4)_2$.

In addition, a solution was prepared by mixing and dissolving the following materials using a propeller type stirring apparatus. For information, when the following materials were mixed, the rotation speed of the stirrer was set to 100 r/min.

| Styrene | 75.0 parts by mass |
|---|---|
| N-butyl acrylate | 25.0 parts by mass |
| Amorphous polyester | 13.0 parts by mass |
| Hydrophobized magnetic material 1 | 90.0 parts by mass |
| Crystalline polyester resin B-1 | 8.0 parts by mass |
| Iron complex of a monoazo dye (T-77: produced by Hodogaya Chemical Co., Ltd.) | 1.0 part by mass |
| 1,6-Hexanediol diacrylate | 0.5 parts by mass |
| Crystalline material 1 | 20.0 parts by mass |

After that, the mixed liquid was heated to a temperature of 60° C., and then was stirred with a TK homomixer (manufactured by PRIMIX Corporation (formerly Tokushu Kika Kogyo Co., Ltd.)) while the rotation speed of the stirrer was set to 9000 r/min; and the solid component was dissolved and dispersed.

Into the mixed liquid, 10.0 parts by mass of 2,2'-azobis (2,4-dimethylvaleronitrile) which was a polymerization initiator was charged into and dissolved in the mixed liquid, and thereby, a polymerizable monomer composition was prepared. Next, the above polymerizable monomer composition was charged into the above aqueous medium, and the mixture was heated to a temperature of 60° C.; and then while CLEARMIX was rotated at a rotation peripheral speed of 33 m/s, the grains were produced for 15 minutes.

After that, the liquid was transferred to a propeller type stirring apparatus, and was reacted at a temperature of 70° C. for 5 hours while having been stirred at 100 revolutions/min; then was heated to a temperature of 85° C., and further was reacted for 4 hours; and the magnetic toner particles were produced. After the polymerization reaction was finished, the suspension liquid was cooled to room temperature. After cooling, hydrochloric acid was added to the suspension liquid to lower the pH to 2.0 or lower to dissolve the inorganic fine particles. Furthermore, the magnetic toner particles were repeatedly washed with water several times, then were dried at 40° C. for 72 hours using a dryer, and then were classified using a multi-division classifier utilizing the Coanda effect; and toner particle 1 was obtained.

To the obtained toner particle 1 (100 parts by mass), 1.0 parts of hydrophobic silica having a BET specific surface area of 200 $m^2/g$ was externally added by a Henschel mixer (Nippon Coke & Engineering Co., Ltd. (formerly Mitsui Miike Chemical Engineering Machinery Co., Ltd.)), and thereby a toner 1 was obtained which had a weight average particle size (D4) of 7.1 μm. The physical properties of the toner 1 are shown in the following Table 3.

Production Examples of Toners 2 to 12 and Comparative Toners 1 to 4

Toners 2 to 12 and comparative toners 1 to 4 were produced in the same manner as in the method of producing the toner 1, except for the magnetic materials, the crystalline materials, the amorphous thermoplastic resins, and 1,6-hexanediol diacrylate described in Tables 1 to 4. The physical properties of the toners 2 to 12 and comparative toners 1 to 4 are shown in the following Table 3. For the production of the toner 2, 20.0 parts by mass of the crystalline material 1 and 5.0 parts by mass of the crystalline material 6 were used. As a result of the analysis of the toner 2, S2 was 2.5%. The crystalline material that was detected as S2 was examined, and was found to be stearic acid behenate.

Production Example of Toner 13

(Preparation of Resin Particle Dispersion Liquid)
[Preparation of Resin Particle Dispersion Liquid (1)]
  Terephthalic acid: 30 parts by mole
  Fumaric acid: 70 parts by mole
  Ethylene oxide adduct of bisphenol A: 5 parts by mole
  Propylene oxide adduct of bisphenol A: 95 parts by moles The above materials were charged into a flask that has 5 liters of interior content and is equipped with a stirring apparatus, a nitrogen inlet tube, a temperature sensor and a fractionating column, the temperature was raised to 210° C. over 1 hour, and 1 part of titanium tetraethoxide was charged with respect to 100 parts of the above materials. The temperature was raised to 230° C. over 0.5 hours while the produced water was distilled off, the dehydration condensation reaction was continued at this temperature for 1 hour, and then the reaction product was cooled. Thus, a polyester resin (1) was synthesized that had a weight average molecular weight of 18,500, an acid value of 14 mgKOH/g, and a glass transition temperature of 59° C.

Into a vessel equipped with a temperature adjusting unit and a nitrogen replacing unit, 40 parts of ethyl acetate and 25 parts of 2-butanol were charged to form a mixed solvent, and then 100 parts of the polyester resin (1) was gradually charged into and was dissolved in the mixed solvent; and an aqueous solution of 10% by mass of ammonia (in an amount corresponding to three times the acid value of the resin in terms of molar ratio) was added thereto, and the mixture was stirred for 30 minutes.

Next, the inside of the vessel was replaced with dry nitrogen, the temperature was kept at 40° C., and 400 parts of ion-exchanged water was added dropwise at a rate of 2 parts/min, while the mixed liquid was stirred for emulsification. After the dropwise addition was finished, the emulsified liquid was returned to room temperature (20° C. to 25° C.), and was subjected to bubbling with dry nitrogen for 48 hours while being stirred, and thereby ethyl acetate and 2-butanol were reduced to 1,000 ppm or lower; and a resin particle dispersion liquid was obtained in which resin particles having a volume average particle size of 200 nm were dispersed. Ion-exchanged water was added to the resin particle dispersion liquid, the solid content was adjusted to 20% by mass, and then a resin particle dispersion liquid (1) was obtained.

[Preparation of Resin Particle Dispersion Liquid (2)]
A resin particle dispersion liquid (2) was obtained in the same manner as in the preparation of the above resin particle dispersion liquid 1, except that the amorphous thermoplastic resin 1 was used in place of the polyester resin.

[Preparation of Resin Particle Dispersion Liquid (3)]
A resin particle dispersion liquid (3) was obtained in the same manner as in the preparation of the above resin particle dispersion liquid 1, except that the amorphous thermoplastic resin 6 was used in place of the polyester resin.

(Preparation of Colorant Particle Dispersion Liquid)
[Preparation of Colorant Particle Dispersion Liquid (1)]
  Cyan pigment C. I. Pigment Blue 15:3 (copper phthalocyanine, produced by DIC Corporation, trade name: FASTOGEN BLUE LA5380): 70 parts
  Anionic surfactant (produced by Dai-Ichi Kogyo Seiyaku Co., Ltd., NEOGEN RK): 5 parts
  Ion-exchanged water: 200 parts The above materials were mixed, and dispersion was carried out for 10 minutes using a homogenizer (T50 digital Ultra-Turrax manufactured by IKA company). Ion-exchanged water was added so that the amount of solid content in the dispersion liquid became 20% by mass, and a colorant particle dispersion liquid (1) was obtained in which the colorant particles having a volume average particle size of 190 nm were dispersed.

(Preparation of Release Agent Particle Dispersion Liquid)

| [Preparation of release agent particle dispersion liquid (1)] | |
|---|---|
| Crystalline material 1 | 100 parts |
| Anionic surfactant (produced by Dai-ichi Kogyo Seiyaku Co., Ltd., NEOGEN RK) | 1 part |
| Ion-exchanged water | 350 parts |

The above materials were mixed, the mixture was heated to 100° C., and the crystalline material was dispersed using a homogenizer (T50 digital Ultra-Turrax manufactured by IKA Company); then the liquid was subjected to dispersion treatment using a Manton-Gorin high-pressure homogenizer (manufactured by Gorin); and a release agent particle dispersion liquid (solid content: 20% by mass) (1) was obtained in which release agent particles having a volume average particle size of 200 nm were dispersed.

(Production of Toner Particle)
[Production of Toner Particle (13)]

An apparatus was prepared in which a round type flask made from stainless steel and a vessel A are connected by a tube pump A, an accommodated liquid which is accommodated in the vessel A is fed to the flask by driving of the tube pump A, the vessel A and a vessel B are connected by a tube pump B, and an accommodated liquid which is accommodated in the vessel B is fed to the vessel A by driving of the tube pump B. Then, using this apparatus, the following operation was carried out.

Resin particle dispersion liquid (1): 500 parts
  Colorant particle dispersion liquid (1): 40 parts
  Anionic surfactant (TaycaPower): 2 parts The above materials were charged into the round type flask made from stainless steel, 0.1 N of nitric acid was added to adjust the pH to 3.5, and then 30 parts of an aqueous nitric acid solution was added thereto in which the concentration of poly-aluminum chloride was 10% by mass. Subsequently, dispersion was carried out at 30° C. using a homogenizer (T50 digital Ultra-Turrax manufactured by IKA Company), and then the particle size of the agglomerated particle was grown in a heating oil bath while the temperature was raised at a rate of 1° C./30 minutes.

On the other hand, 50 parts of the resin particle dispersion liquid (3) was charged into the vessel A which was a bottle made from polyester, and 25 parts of the release agent particle dispersion liquid (1) was charged similarly into the vessel B. Next, the liquid feed rate of the tube pump A was set to 0.70 parts/min, and the liquid feed rate of the tube pump B was set to 0.14 parts/min; and the tube pumps A and B were driven from the time point when the temperature inside the round type flask made from stainless steel reached 37.0° C., in which the agglomerated particles were being formed, and the liquid feed of each dispersion liquid was started. Thereby, the mixed dispersion liquid in which the resin particles and the release agent particles were dispersed was fed from the vessel A to the round type flask made from stainless steel, in which the agglomerated particles were being formed, while the concentration of the release agent particle was gradually enhanced.

Then, from the time point when the feeding of each dispersion liquid to the flask was completed and the temperature inside the flask reached 48° C., the resultant dispersion liquid was kept there for 30 minutes; and the second agglomerated particles were formed.

After that, 50 parts of the resin particle dispersion liquid (2) was slowly added into the flask, and the mixed liquid was kept for 1 hour; 0.1 N of an aqueous sodium hydroxide solution was added into the mixed liquid to adjust the pH to 8.5; and then, the mixture was heated to 85° C. while stirring was continued, and was kept for 5 hours. After that, the mixture was cooled to 20° C. at a rate of 20° C./min.

The above dispersion liquid was filtered, the residue was sufficiently washed with ion-exchanged water, and was dried. Thereby, toner particles 13 having a volume average particle size of 7.0 µm were obtained. The physical properties of the obtained toner particle 13 are shown in Table 3.

Production Example of Comparative Toner 5

(Method of Producing Untreated Magnetic Material)

Into an aqueous ferrous sulfate solution, a sodium hydroxide solution in an amount of 1.1 molar equivalent amounts to the iron element, $SiO_2$ in an amount of 0.60% by mass in terms of silicon element with respect to the iron element, and sodium phosphate in an amount of 0.15% by mass in terms of phosphorus element with respect to the iron element were mixed. In this way, an aqueous solution containing ferrous hydroxide was prepared. Next, a pH of the aqueous solution was set to 8.0, and an oxidation reaction was carried out at 85° C. while air was blow thereinto; and thereby a slurry liquid was prepared that had seed crystals.

Next, an aqueous ferrous sulfate solution was added to the slurry liquid so as to become 1.0 molar equivalent amounts to the initial alkali amount (sodium component of caustic soda), and then the oxidation reaction was promoted while the pH of the slurry liquid was maintained at 7.5 and air was blown thereinto; and thereby a slurry liquid containing magnetic iron oxide was obtained. This slurry was filtered, and the residue was washed, dried and subjected to disintegration treatment: and thereby an untreated magnetic material was obtained which had a number average primary particle size (D1) of 0.21 µm.

[Preparation of Silane Compound]

An aqueous solution was prepared by adding 20 parts by mass of isobutyl trimethoxy silane dropwise to 80 parts by mass of ion-exchanged water, while having been stirred. After that, a pH of the aqueous solution was adjusted to 5.5, and while the temperature was kept at 40° C., the silane was dispersed using a Disper blade at 0.46 m/s for 2 hours to be hydrolyzed; and a silane compound was obtained that was an aqueous solution which contained the hydrolysate.

(Production of Hydrophobized Magnetic Material 6)

An untreated magnetic material was charged into a Henschel mixer (manufactured by Nippon Coke & Engineering Co., Ltd., (formerly Mitsui Miike Chemical Engineering Machinery Co., Ltd.)), and then in a state in which the untreated magnetic material was dispersed at a rotation speed of 34.5 m/s, a silane compound (3.8 parts by mass) was added thereto while having been sprayed. Next, dispersion was carried out for 10 minutes as it was; then, the magnetic material to which the silane compound had adsorbed was taken out; and the treated magnetic material was dried at 160° C. for 2 hours in a state of having been quietly placed, and simultaneously the condensation reaction of the silane compound was promoted. After that, the magnetic material was passed through a sieve having an opening of 100 µm, and a hydrophobized magnetic material 6 was obtained. The physical properties of the obtained hydrophobized magnetic material 6 are shown in Table 1.

(Production of Comparative Toner 5)

Into a vessel equipped with a high-speed stirrer CLEARMIX (manufactured by M Technique Co., Ltd.), 850 parts by mass of an aqueous solution of 0.1 mol/L $Na_3PO_4$ was added, and was heated to 60° C. while the solution was stirred at a rotation peripheral speed of 33 m/s. Into the solution, 68 parts by mass of an aqueous solution of 1.0 mol/L $CaCl_2$) was added, and an aqueous medium was prepared which contained a fine poorly water-soluble dispersing agent $Ca_3(PO_4)_2$.

In addition, a solution was prepared by mixing and dissolving the following materials using a propeller type stirring apparatus. For information, when the following materials were mixed, the rotation speed of the stirrer was set to 100 r/min.

| | |
|---|---|
| Styrene | 75.0 parts by mass |
| N-butyl acrylate | 25.0 parts by mass |
| Amorphous polyester | 13.0 parts by mass |
| Hydrophobized magnetic material 6 | 90.0 parts by mass |
| Crystalline material 4 (crystalline polyester, condensation product of 1-9 nonane diol and sebacic acid, acid value 2.0 mg/KOH, and weight average molecular weight Mw of 20400, melting point 74.0°, and SP value 9.62) | 8.0 parts by mass |
| Iron complex of a monoazo dye (T-77: produced by Hodogaya Chemical Co., Ltd.) | 1.0 part by mass |
| Crystalline material 6 | 15.0 parts by mass |

After that, the mixed liquid was heated to a temperature of 60° C., and then was stirred by a TK homomixer (manufactured by PRIMIX Corporation (formerly Tokushu Kika Kogyo Co., Ltd.)), after the rotation speed of the stirrer was set to 9000 r/min, and the solid components were dissolved and/or dispersed.

Into the mixed liquid, 10.0 parts by mass of 2,2'-azobis (2,4-dimethyl Valero nitrile) which was a polymerization initiator was charged into and dissolved in the mixed liquid, and thereby, a polymerizable monomer composition was prepared. Next, the above polymerizable monomer composition was charged into the above aqueous medium, and the mixture was heated to a temperature of 60° C.; and then while CLEARMIX was rotated at a rotation peripheral speed of 33 m/s, the grains were produced for 15 minutes.

After that, the liquid was transferred to a propeller type stirring apparatus, and was reacted at a temperature of 70° C. for 5 hours while having been stirred at 100 revolutions/min; then was heated to a temperature of 85° C., and further was reacted for 4 hours; and the magnetic toner particles were produced. After the polymerization reaction was finished, the suspension liquid was heated to 100° C. and was kept for 2 hours; and the remaining monomer was removed while the suspension liquid was heated in a reduced pressure. Next, as a cooling process, ice was charged into the suspension liquid to cool the suspension liquid to 20° C. from 100° C. in 2 minutes. After cooling, hydrochloric acid was added to the suspension liquid to lower the pH to 2.0 or lower, and thereby dissolved the inorganic fine particles. Furthermore, the magnetic toner particles were repeatedly washed with water several times, then were dried at 40° C. for 72 hours using a dryer, and then were classified using a multi-division classifier that utilized the Coanda effect; and a comparative toner particle 5 was obtained.

To the obtained comparative toner particle 5 (100 parts by mass), 1.0 part of hydrophobic silica of which the specific surface area by the BET method was 200 m$^2$/g was externally added by a Henschel mixer (Nippon Coke & Engineering Co., Ltd., (formerly Mitsui Miike Chemical Engineering Machinery Co., Ltd.)), and thereby a comparative toner 5 was obtained which had a weight average particle size (D4) of 8.1 µm. The physical properties of the comparative toner 5 are shown in the following Table 3. The S2 of the obtained toner was 0.2%. The crystalline material that was detected in the S2 was checked, and was di-behenyl sebacate.

Production Example of Comparative Toner 6

(Preparation of Aqueous Medium)
Ion-exchanged water: 400.0 parts
Trisodium phosphate: 7.0 parts
The above mixture was kept at 60° C. while having been stirred with a high-speed stirrer CLEARMIX (manufactured by M Technique Co., Ltd.), at a speed of 15,000 rpm. Next, 4.1 parts of calcium chloride was added to the mixture, and an aqueous medium was prepared which contained an inorganic dispersion stabilizer.
(Preparation of Polymerizable Monomer Composition 1)
Styrene: 40.0 parts
Copper phthalocyanine pigment (Pigment Blue 15:3): 6.5 parts
Charge control agent LR-147 (produced by Japan Carlit Co., Ltd.): 0.3 parts
The above materials were mixed, and were stirred together with zirconia beads (3/16 inch) by an attritor (manufactured by Mitsui Mining Co., Ltd.) at 200 rpm for 4 hours, and the beads were separated; and a pigment dispersion liquid was produced (pigment dispersion process).
(Preparation of Polymerizable Monomer Composition 2)
Styrene: 35.0 parts
n-Butyl acrylate: 25.0 parts
Amorphous resin 8: 4.0 parts
The above materials were mixed and stirred for 2 hours, thereby the amorphous resin 8 was dissolved, and a polymerizable monomer composition 2 was obtained.
(Preparation of Polymerizable Monomer Composition 3: Dissolution Process)
After the polymerizable monomer compositions 1 and 2 were mixed, the following materials were added thereto.
Fischer-Tropsch wax: 10.0 parts
(Melting point: 78° C.)
Divinylbenzene: 0.02 parts
After the addition, the mixture was heated to 60° C., and was continued to be stirred for 10 minutes, and a polymerizable monomer composition 3 was obtained.
(Granulation/Polymerization Process)
The obtained polymerizable monomer composition 3 was charged into the above aqueous medium. Next, 10.0 parts of t-butyl peroxypivalate (25% toluene solution) was added thereto, and grains were produced for 10 minutes while the number of revolutions of the stirrer was maintained at 15000 rpm. After that, the stirrer was changed from a high-speed stirrer to a propeller stirring blade, the internal temperature was raised to 70° C., and the mixture was reacted for 5 hours while having been slowly stirred. Next, the temperature in the vessel was raised to 85° C., and the polymerization reaction was further carried out for 4 hours.
(Distillation/Washing/Drying/Classification/External Addition Process)
After the polymerization reaction was finished, toluene and a remaining monomer were distilled off while the composition was heated in a reduced pressure, and subsequently, after cooling, hydrochloric acid was added thereto to lower the pH to 2.0 or lower to dissolve the inorganic dispersion stabilizer. Furthermore, the mixture was filtered, and the residue was washed with water, and dried at 40° C. for 72 hours using a dryer. The obtained dried product was subjected to classification by an Elbow-Jet classifier (manufactured by Nittetsu Mining Co., Ltd.), and a fine powder and a coarse powder were simultaneously removed; and a comparative toner particle 6 was obtained that had a cyan color.

A hydrophobic silica in an amount of 1.0 part, of which the BET specific surface area was 200 m$^2$/g, and titanium oxide in an amount of 0.3 parts, of which the BET specific surface area was 100 m$^2$/g, were externally added to 100.0 parts of the comparative toner particle 6, with a Henschel mixer (manufactured by Mitsui Mining Co., Ltd.) for 300 seconds, and a comparative toner 6 was obtained. The physical properties of the obtained comparative toner 6 are shown in Table 3. The S2 of the obtained toner was 0.2%. The crystalline material that was detected in the S2 was checked, and was Fischer-Tropsch wax.

Production Example of Comparative Toner 7

A comparative toner 7 was produced in the same manner as in the production of the comparative toner 6, except that the amorphous thermoplastic resin was changed as shown in Table 3. The physical properties of the obtained comparative toner 7 are shown in Table 3. The S2 of the obtained toner was 0.2%. The crystalline material that was detected in the S2 was checked, and was Fischer-Tropsch wax.

Production Example of Comparative Toner 8

(Production of Magnetic Iron Oxide)
An aqueous solution of ferrous salt containing ferrous hydroxide colloid was obtained by mixing 55 L of an aqueous solution of 4.0 mol/L sodium hydrate with 50 L of an aqueous solution of ferrous sulfate containing 2.0 mol/L of $Fe^{2+}$, and stirring the mixture. A slurry containing core particles was obtained by keeping this aqueous solution at 85° C., and subjecting the solution to an oxidation reaction while blowing air at 20 L/min.

The obtained slurry was filtered by a filter press, the residue was washed; and then the core particles were dispersed in water again, and a reslurry was obtained. To this reslurry liquid, sodium silicate was added in an amount of 0.20% by mass in terms of silicon per 100 parts by mass of the core particles, the pH of the slurry liquid was adjusted to 6.0, and the mixture was stirred; and thereby a magnetic iron oxide particle was obtained that had a silicon-rich surface. The obtained slurry was filtered with a filter press; the residue was washed, and was further dispersed in ion-exchanged water; and a reslurry was obtained. Into this reslurry liquid (50 g/L of solid content), 500 g (10% by mass with respect to magnetic iron oxide) of an ion exchange resin SK110 (produced by Mitsubishi Chemical Corporation) was charged, and the mixture was subjected to ion exchange while having been stirred for 2 hours. After that, the ion exchange resin was removed by filtration through a mesh, the filtrate was filtered by a filter press, and the residue was washed, dried and disintegrated; and a magnetic iron oxide was obtained that had a number average diameter of 0.23 µm.
(Production of Silane Compound)
Into 70 parts by mass of ion-exchanged water, 30 parts by mass of iso-butyl trimethoxy silane was added dropwise while the mixture was stirred. After that, this aqueous solution was kept at a pH of 5.5 and a temperature of 55° C., and dispersion was carried out using a Disper blade at a peripheral speed of 0.46 m/s for 120 minutes, as well as hydrolyzation. After that, the pH of the aqueous solution was adjusted to 7.0, the solution was cooled to 10° C., and the hydrolysis reaction was stopped. Thus, an aqueous solution containing a silane compound was obtained.

(Production of Magnetic Material 7)

Into a high-speed mixer (Model LFS-2 manufactured by Fukae Powtec Co., Ltd.), 100 parts by mass of the magnetic iron oxide was charged, and 8.0 parts by mass of an aqueous solution containing a silane compound was added dropwise thereinto over 2 minutes, while the mixture was stirred at a rotation speed of 2000 rpm. After that, the mixture was mixed and stirred for 5 minutes. Next, in order to enhance a sticking property of the silane compound, the mixture was dried at 40° C. for 1 hour to decrease the water content, and then, the resultant mixture was dried at 110° C. for 3 hours; and thereby, the condensation reaction of the silane compound was promoted. After that, the resultant was disintegrated and was passed through a sieve having had an opening of 100 μm, and a magnetic material 7 was obtained.

(Production of Amorphous Polyester Resin)

Into a reaction tank equipped with a nitrogen-introducing tube, a dewatering tube, a stirrer and a thermocouple, 40 mol % terephthalic acid, 10 mol % trimellitic acid and 50 mol % $PO_2$ mol adduct of bisphenol A were charged, and then, as a catalyst, 1.5 parts by mass of dibutyltin was added to 100 parts by mass of the total amount of monomers. Next, the mixture was rapidly heated to 180° C. under normal pressure in a nitrogen atmosphere, and then, while the mixture was heated from 180° C. to 210° C. at a rate of 10° C./hour, water was distilled off and the mixture was subjected to polycondensation. After the temperature reached 210° C., the pressure in the reaction tank was reduced down to 5 kPa or lower, and the mixture was subjected to the polycondensation under conditions of 210° C. and 5 kPa or lower; and an amorphous polyester resin was obtained. At this time, the polymerization time period was adjusted so that a softening point of the obtained polyester resin became 120° C.

(Production of Crystalline Polyester)

Into a reaction tank equipped with a nitrogen-introducing tube, a dewatering tube, a stirrer and a thermocouple, 49 mol % of 1,9-nonanediol, 49 mol % of 1,10-decanedioic acid and 2 mol % of n-octadecanoic acid were charged, and then as a catalyst, 1 part by mass of tin dioctylate was added thereto with respect to 100 parts by mass of the total amount of monomers; and the mixture was heated to 140° C. in a nitrogen atmosphere and was allowed to react for 6 hours while water was distilled off under normal pressure. Next, the mixture was allowed to react while having been heated to 200° C. at a rate of 10° C./hour, after having reached 200° C., was allowed to react for 2 hours, and then, after the pressure in the reaction tank was reduced to 5 kPa or lower, was allowed to react for 3 hours at 200° C.; and a crystalline polyester was obtained. An acid value of the crystalline polyester was 2.2, a molecular weight (Mw) was 34200, and the SP value SPa was 11.47.

Production Example of Comparative Toner 8

(Preparation of First Aqueous Medium)

A first aqueous medium containing a dispersion stabilizer A was obtained by charging 2.9 parts by mass of sodium phosphate dodecahydrate into 353.8 parts by mass of ion-exchanged water; heating the mixture to 60° C. while having stirred the mixture using a TK type homomixer (manufactured by Tokushu Kika Kogyo Co., Ltd.); then adding an aqueous solution of calcium chloride, which was obtained by adding 1.7 parts by mass of calcium chloride dihydrate to 11.7 parts by mass of ion-exchanged water, and an aqueous solution of magnesium chloride, which was obtained by adding 0.5 parts by mass of magnesium chloride to 15.0 parts by mass of ion-exchanged water, thereto; and stirring the mixture.

(Preparation of Polymerizable Monomer Composition)

| | |
|---|---|
| Styrene | 75.0 parts by mass |
| N-butyl acrylate | 25.0 parts by mass |
| 1,6-Hexanediol diacrylate | 0.5 parts by mass |
| Magnetic material | 95.0 parts by mass |
| Amorphous polyester resin | 5.0 parts by mass |

The above materials were uniformly dispersed and mixed using an attritor (manufactured by Mitsui Miike Chemical Engineering Machinery Co., Ltd.), then the mixture was heated to 60° C., 15.0 parts by mass of stearic acid behenate (behenyl stearate wax (melting point: 68° C.)) and 8.0 parts by mass of paraffin wax (HNP-9, manufactured by Nippon Seiro Co., Ltd.) were added thereto as an ester wax and as a hydrocarbon wax, respectively, and were mixed and dissolved; and a polymerizable monomer composition was obtained.

(Preparation of Second Aqueous Medium)

A second aqueous medium containing a dispersion stabilizer B was obtained by charging 0.6 parts by mass of sodium phosphate dodecahydrate into 166.8 parts by mass of ion-exchanged water; heating the mixture to 60° C. while having stirred the mixture using a paddle stirring blade; then adding an aqueous solution of calcium chloride, which was obtained by adding 0.3 parts by mass of calcium chloride dihydrate to 2.3 parts by mass of ion-exchanged water thereto; and stirring the mixture.

(Granulation)

The above polymerizable monomer composition was charged into the above first aqueous medium, and the granulation liquid was treated using CAVITRON (manufactured by Eurotec Co., Ltd.) at a peripheral speed of a rotator of 29 m/s for 1 hour to be uniformly dispersed and mixed; furthermore, 7.0 parts by mass of t-butyl peroxypivalate was charged as a polymerization initiator, and the mixture was subjected to granulation while having been stirred at a peripheral speed of 22 m/s for 10 minutes by CLEARMIX (manufactured by M Technique Co., Ltd.) under $N_2$ atmosphere at 60° C.; and a granulation liquid was obtained that contained droplets of the polymerizable monomer composition.

(Polymerization/Distillation/Drying/External Addition)

The above granulation liquid was charged into the above second aqueous medium, and the mixture was allowed to react at 74° C. for 3 hours while having been stirred by a paddle stirring blade. After the reaction ended, the mixture was heated to 98° C. and distilled for 3 hours, and a reaction slurry was obtained. After that, as a cooling process, water at 0° C. was charged into the reaction slurry, and the reaction slurry was cooled from 98° C. to 45° C. at a rate of 100° C./min, then was further heated, and kept at 50° C. for 3 hours. After that, the reaction slurry was allowed to cool to 25° C. at room temperature. The cooled reaction slurry was cleaned by addition of HCl, the resultant slurry was filtered, and the residue was dried; and a comparative toner particle 8 was obtained that had a weight average particle size of 7.4 μm.

The following materials were mixed with 100 parts by mass of the obtained comparative toner particle 8, using a Henschel mixer (FM-0 type manufactured by Mitsui Miike Chemical Engineering Machinery Co., Ltd.), and a comparative toner 8 was obtained. The physical properties of the obtained comparative toner 8 are shown in Table 3. The S2 of the obtained toner was checked, and was 0.200. The crystalline material that was detected in the S2 was checked, and was paraffin wax.

TABLE 3

| | Production conditions | | | | | Physical properties | | | |
|---|---|---|---|---|---|---|---|---|---|
| | Colorant | Crystalline material | Crystalline material | Amorphous thermoplastic resin | 1,6-Hexane diacrylate | SPa-SPc | S2(%) | D4(μm) | Viscosity at 120° C. |
| Toner 1 | Magnetic material 1 | Crystalline material 1 | | Amorphous thermoplastic resin 1 | 0.5 | 3.08 | 2.5 | 7.1 | $5.0 \times 10^4$ |
| Toner 2 | Magnetic material 1 | Crystalline material 1 | Crystalline material 6 | Amorphous thermoplastic resin 2 | 0.5 | 3.08 | 2.5 | 7.1 | $5.0 \times 10^4$ |
| Toner 3 | Magnetic material 1 | Crystalline material 1 | | Amorphous thermoplastic resin 3 | 0.3 | 3.79 | 2.5 | 7.1 | $0.5 \times 10^4$ |
| Toner 4 | Magnetic material 1 | Crystalline material 1 | | Amorphous thermoplastic resin 3 | 0.9 | 3.79 | 2.5 | 7.1 | $9.0 \times 10^5$ |
| Toner 5 | Magnetic material 1 | Crystalline material 1 | | Amorphous thermoplastic resin 3 | 0.9 | 3.79 | 2.5 | 7.1 | $5.0 \times 10^4$ |
| Toner 6 | Magnetic material 1 | Crystalline material 1 | | Amorphous thermoplastic resin 4 | 0.9 | 3 | 2.5 | 7.1 | $9.0 \times 10^5$ |
| Toner 7 | Magnetic material 1 | Crystalline material 1 | | Amorphous thermoplastic resin 5 | 0.9 | 3.07 | 2.5 | 7.1 | $9.0 \times 10^5$ |
| Toner 8 | Magnetic material 2 | Crystalline material 1 | | Amorphous thermoplastic resin 5 | 0.9 | 3.07 | 1.0 | 7.1 | $9.0 \times 10^5$ |
| Toner 9 | Magnetic material 3 | Crystalline material 1 | | Amorphous thermoplastic resin 5 | 0.9 | 3.07 | 20.0 | 7.1 | $9.0 \times 10^5$ |
| Toner 10 | Magnetic material 1 | Crystalline material 2 | | Amorphous thermoplastic resin 4 | 0.9 | 2.53 | 2.5 | 7.1 | $9.0 \times 10^5$ |
| Toner 11 | Magnetic material 1 | Crystalline material 3 | | Amorphous thermoplastic resin 3 | 0.9 | 4.38 | 2.5 | 7.1 | $9.0 \times 10^5$ |
| Toner 12 | Magnetic material 1 | Crystalline material 3 | | Amorphous thermoplastic resin 6 | 0.9 | 3.12 | 2.5 | 7.1 | $9.0 \times 10^5$ |
| Toner 13 | Silane | Crystalline material 1 | | Amorphous thermoplastic resin 1 | 0.5 | 3.08 | 1.0 | 7.0 | $5.0 \times 10^4$ |
| Comparative toner 1 | Magnetic material 1 | Crystalline material 2 | | Amorphous thermoplastic resin 6 | 0.5 | 2.06 | 2.5 | 7.1 | $5.0 \times 10^4$ |
| Comparative toner 2 | Magnetic material 1 | Crystalline material 3 | | Amorphous thermoplastic resin 7 | 0.5 | 4.59 | 2.5 | 7.1 | $5.0 \times 10^4$ |
| Comparative toner 3 | Magnetic material 4 | Crystalline material 1 | | Amorphous thermoplastic resin 5 | 0.9 | 3.07 | 0.8 | 7.1 | $9.0 \times 10^5$ |
| Comparative toner 4 | Magnetic material 5 | Crystalline material 1 | | Amorphous thermoplastic resin 5 | 0.9 | 3.07 | 24.0 | 7.1 | $9.0 \times 10^5$ |
| Comparative toner 5 | Magnetic material 6 | Crystalline material 4 | Crystalline material 6 | Amorphous thermoplastic resin 1 | 0.0 | 2.06 | 0.2 | 8.1 | $5.0 \times 10^3$ |
| Comparative toner 6 | Silane | Crystalline material 5 | | Amorphous thermoplastic resin 8 | 0.0 | 3.1 | 0.2 | 7.1 | $5.0 \times 10^4$ |
| Comparative toner 7 | Silane | Crystalline material 5 | | Amorphous thermoplastic resin 9 | 0.0 | 3.36 | 0.2 | 7.1 | $5.0 \times 10^4$ |
| Comparative toner 8 | Magnetic material 7 | Crystalline material 1 | Crystalline material 7 | Amorphous polyester resin | 0.5 | 3.36 | 0.4 | 7.4 | $5.0 \times 10^4$ |

TABLE 4

|  | Material name | SP value | Melting point (° C.) |
|---|---|---|---|
| Crystalline material 1 | Stearic acid behenate | 8.60 | 68.0 |
| Crystalline material 2 | Dipentamyristate | 9.07 | 68.0 |
| Crystalline material 3 | Polyolefin wax | 8.01 | 72.0 |
| Crystalline material 4 | Crystalline polyester | 9.62 | 74.0 |
| Crystalline material 5 | Fischer-Tropsch wax | 8.11 | 78.0 |
| Crystalline material 6 | Di-behenyl sebacate | 8.77 | 73.3 |
| Crystalline material 7 | Paraffin wax HNP9 | 8.11 | 75.0 |

Example 1

(Evaluation of Low-Temperature Fixability)

The toner 1 was subjected to the following evaluations.

The evaluation was carried out in an environment of 23° C. and 50% RH. FOX RIVERBOND paper (110 g/m²) was used for a fixing medium. When the medium is used that has a relatively large surface unevenness and is a thick paper, it becomes easy for white spots which will be described later to occur, and the low-temperature fixability can be severely evaluated. As the image forming apparatus, a commercially available LBP-3100 (manufactured by Canon Inc.) was used, and a modified machine was used in which the printing speed was modified from 16 sheets/min to 40 sheets/min. Furthermore, a size of a fixing device was modified to become small so that the time period during which the medium was in contact with the fixing device when the medium passed through the fixing device became from 150 m seconds to 50 m seconds. In this condition, both high-speed printing and downsizing of the fixing device can be achieved, but on the other hand, the evaluation for the fixability of the toner becomes extremely severe.

Solid black was continuously printed on 100 sheets in such a state that the fixing device was cooled to room temperature (25° C.), and an average value of the number of white spots in solid black images on 95 to 100 sheets was measured. When the solid black is continuously printed, heat of the fixing device is taken away by the media, and the fixing device becomes a state of not keeping sufficient heat therein; and accordingly, the low-temperature fixability of the toner results in being severely evaluated. When the fixability of the toner is insufficient, a so-called white spot image is output in which an unfixed toner becomes a white spot. An evaluation result is determined based on the number of the white spots. At this time, the result is evaluated by an average number of produced white spots based on visual observation that uses a microscope or the like, which can magnify the image to 10 times larger. The smaller the average number is, the better the low-temperature fixability of the toner is. In the present evaluation, a performance of the fixability was evaluated according to a temperature of the fixing device at which the number of the white spots became less than 10. The lower the temperature is, the better the low-temperature fixability of the toner is.

(Evaluation of Dirt on Conveying Member)

The toner 1 was subjected to the following evaluations.

The evaluation was carried out in an environment of 23° C. and 50% RH. As a fixing medium, A4 size Oce Red Label paper (basis weight of 80 g/m²) was used which is produced by Canon Inc. As the image forming apparatus, a commercially available LBP-3100 (manufactured by Canon Inc.) was used, and a modified machine was used in which the printing speed was modified from 16 sheets/min to 40 sheets/min. Furthermore, a size of a fixing device was modified to become small so that the time period in which the medium was in contact with the fixing device when the medium passed through the fixing device became from 150 m seconds to 50 m seconds.

A temperature of the fixing device was set to the temperature obtained in the evaluation of the low-temperature fixability, and a halftone image having a coverage rate of 10% was continuously printed on 2000 sheets. When the toner has adhered to the conveying member, a longitudinal streak occurs in a printed solid white image. The solid white image was observed with a microscope, and the width of the longitudinal streak observed at this time was measured. The smaller the width of the longitudinal streak is, the better the dirt of the conveying member is.

(Endurance Evaluation)

The toner 1 was subjected to the following evaluations.

The evaluation was carried out in an environment of 23° C. and 50% RH. As a fixing medium, A4 size Oce Red Label paper (basis weight of 80 g/m²) was used which is produced by Canon Inc. As the image forming apparatus, a commercially available LBP-3100 (manufactured by Canon Inc.) was used, and a modified machine was used in which the printing speed was modified from 16 sheets/min to 40 sheets/min. Furthermore, a size of a fixing device was modified to become small so that the time period in which the medium was in contact with the fixing device when the medium passed through the fixing device became from 150 M seconds to 50 m seconds.

A temperature of the fixing device was set to the temperature obtained in the evaluation of the low-temperature fixability, and a horizontal line image having a coverage rate of 5% was printed on 2000 sheets in an intermittent mode. Densities of the solid images before and after the endurance were measured using a Macbeth densitometer (manufactured by Macbeth Corp.). The higher the density is, the better the durability is.

Examples 2 to 13 and Comparative Examples 1 to 8

Examples 2 to 13 and Comparative Examples 1 to 8 were produced in the same manner as in Example 1, except that the toner 1 was changed to the toners 2 to 13 and the comparative toners 1 to 8 in Example 1, and were tested. For information, in Example 13, Comparative Example 6 and Comparative Example 7, the image forming apparatus was modified so as to be capable of outputting a non-magnetic toner, and then the evaluation was carried out.

The evaluation results are shown in Table 5.

TABLE 5

| Example | Toner | Low-temperature fixing temperature (° C.) | Dirt on conveying member (mm) | Concentration before endurance | Concentration after endurance |
|---|---|---|---|---|---|
| Example 1 | Toner 1 | 160 | 0.32 | 1.45 | 1.42 |
| Example 2 | Toner 2 | 160 | 0.33 | 1.44 | 1.43 |

TABLE 5-continued

| Example | Toner | Low-temperature fixing temperature (° C.) | Dirt on conveying member (mm) | Concentration before endurance | Concentration after endurance |
|---|---|---|---|---|---|
| Example 3 | Toner 3 | 164 | 0.31 | 1.44 | 1.42 |
| Example 4 | Toner 4 | 162 | 0.31 | 1.45 | 1.42 |
| Example 5 | Toner 5 | 163 | 0.32 | 1.43 | 1.41 |
| Example 6 | Toner 6 | 162 | 0.41 | 1.44 | 1.42 |
| Example 7 | Toner 7 | 163 | 0.62 | 1.44 | 1.38 |
| Example 8 | Toner 8 | 167 | 0.63 | 1.42 | 1.38 |
| Example 9 | Toner 9 | 160 | 0.59 | 1.45 | 1.41 |
| Example 10 | Toner 10 | 165 | 0.51 | 1.42 | 1.34 |
| Example 11 | Toner 11 | 165 | 0.48 | 1.44 | 1.34 |
| Example 12 | Toner 12 | 163 | 0.55 | 1.42 | 1.24 |
| Example 13 | Toner 13 | 164 | 0.55 | 1.44 | 1.33 |
| Comparative Example 1 | Comparative toner 1 | 165 | 1.21 | 1.44 | 1.22 |
| Comparative Example 2 | Comparative toner 2 | 165 | 1.08 | 1.45 | 1.05 |
| Comparative Example 3 | Comparative toner 3 | 185 | 0.95 | 1.45 | 1.33 |
| Comparative Example 4 | Comparative toner 4 | 166 | 2.18 | 1.45 | 1.09 |
| Comparative Example 5 | Comparative toner 5 | 195 | 1.65 | 1.44 | 1.28 |
| Comparative Example 6 | Comparative toner 6 | 188 | 1.35 | 1.44 | 1.25 |
| Comparative Example 7 | Comparative toner 7 | 184 | 1.34 | 1.42 | 1.26 |
| Comparative Example 8 | Comparative toner 8 | 180 | 2.11 | 1.44 | 1.25 |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-199152, filed Nov. 30, 2020, which is hereby incorporated by reference herein in its entirety.

What is claimed is:

1. A toner, comprising:
a toner particle having a core-shell structure, the toner particle comprising a core and a shell;
the core comprising a binder resin and a colorant;
the colorant being a hydrophobized magnetic material having a surface that is subjected to hydrophobizing treatment with a silane coupling agent;
the toner comprising a crystalline material; and
the shell comprising an amorphous thermoplastic resin, wherein
$2.50 \leq SPa-SPc \leq 4.50$ when SPc $(J/cm^3)^{0.5}$ is an SP value of the crystalline material calculated by the Fedors method and SPa $(J/cm^3)^{0.5}$ is an SP value of the amorphous thermoplastic resin calculated by the Fedors method,
$1.0 \leq S2 \leq 20.0$ when $S2(\%)$ is a ratio of an area occupied by the crystalline material per area of the toner surface observed by a scanning electron microscope (SEM) after the toner has been subjected to ruthenium staining that treats the toner in an atmosphere of $RuO_4$ (ruthenium tetroxide) gas having 500 Pa for 15 minutes, and
in a spectrum of Si obtained based on a total electron yield method (TEY) using a near-edge X-ray absorption fine structure (NEXAFS) the hydrophobized magnetic material has a peak A in a range of 1844.4 to 1844.8 eV, and a peak B in a range of 1846.1 to 1846.6 eV, and $I_A/(I_A+I_B)/M_{Si}$ is 47-55 where $I_A$ represents an area of the peak A, $I_B$ represents an area of the peak B, and $M_{Si}$ represents the number of moles of Si derived from the silane compound contained in 1 g of the hydrophobized magnetic material.

2. The toner according to claim 1, wherein the toner has a viscosity of $0.5 \times 10^4$ to $9.0 \times 10^5$ Pa·s at 100° C. measured by a flow tester temperature raising method.

3. The toner according to claim 1, wherein Spa is 11.60 to 12.40 $(J/cm^3)^{0.5}$.

4. The toner according to claim 1, wherein the amorphous thermoplastic resin is an amorphous polyester.

5. The toner according to claim 4, wherein the amorphous polyester has an isosorbide unit represented by formula (3)

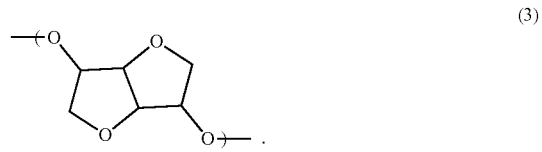

6. The toner according to claim 5, wherein the amorphous polyester is a condensate of only at least one alcohol component selected from the group consisting of dihydric and trihydric or higher alcohols, and at least one carboxylic acid component selected from the group consisting of aromatic polycarboxylic acids, aliphatic polycarboxylic acids and anhydrides thereof, wherein
the alcohol component comprises isosorbide;
the alcohol component and the carboxylic acid component do not have an ester group; and
the amorphous polyester contains the isosorbide unit represented by formula (3) derived from the isosorbide in an amount of 0.10 to 30.00 mol % based on all of the monomer unit derived from the alcohol component and the monomer unit derived from the carboxylic acid component.

7. The toner according to claim 1, wherein the crystalline material is contained in the core.

8. The toner according to claim 1, wherein the crystalline material is contained in the shell.

9. The toner according to claim 1, wherein the crystalline material is contained in the shell and the core.

* * * * *